(12) United States Patent
Yang

(10) Patent No.: US 9,725,589 B2
(45) Date of Patent: Aug. 8, 2017

(54) METHOD OF PREPARING ACRYLIC POLYMERS AND PRODUCTS PRODUCED THEREBY

(71) Applicant: Lubrizol Advanced Materials, Inc., Cleveland, OH (US)

(72) Inventor: Wei-Yeih Yang, Brecksville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/366,407

(22) PCT Filed: Dec. 17, 2012

(86) PCT No.: PCT/US2012/070113
§ 371 (c)(1),
(2) Date: Jun. 18, 2014

(87) PCT Pub. No.: WO2013/096206
PCT Pub. Date: Jun. 27, 2013

(65) Prior Publication Data
US 2014/0336343 A1   Nov. 13, 2014

Related U.S. Application Data

(60) Provisional application No. 61/578,262, filed on Dec. 21, 2011.

(51) Int. Cl.
| | | |
|---|---|---|
| C08L 39/06 | (2006.01) | |
| C08L 33/08 | (2006.01) | |
| C08L 33/10 | (2006.01) | |
| C08L 33/12 | (2006.01) | |
| C08L 33/02 | (2006.01) | |
| C08F 2/14 | (2006.01) | |
| C08F 2/08 | (2006.01) | |
| C08F 226/10 | (2006.01) | |
| C08F 265/02 | (2006.01) | |
| C08F 285/00 | (2006.01) | |
| C08F 222/02 | (2006.01) | |
| C08F 220/62 | (2006.01) | |
| C08F 220/04 | (2006.01) | |
| C08F 220/06 | (2006.01) | |
| C08F 120/04 | (2006.01) | |
| C08F 220/02 | (2006.01) | |
| C08F 120/08 | (2006.01) | |
| C08F 120/02 | (2006.01) | |
| C08F 120/06 | (2006.01) | |
| C08F 122/06 | (2006.01) | |
| C08F 122/04 | (2006.01) | |
| C08F 122/02 | (2006.01) | |
| C08F 271/02 | (2006.01) | |

(52) U.S. Cl.
CPC ............... *C08L 39/06* (2013.01); *C08F 2/08* (2013.01); *C08F 2/14* (2013.01); *C08F 226/10* (2013.01); *C08F 265/02* (2013.01); *C08F 285/00* (2013.01); *C08L 33/02* (2013.01); *C08L 33/08* (2013.01); *C08L 33/10* (2013.01); *C08L 33/12* (2013.01); *C08F 120/02* (2013.01); *C08F 120/04* (2013.01); *C08F 120/06* (2013.01); *C08F 120/08* (2013.01); *C08F 122/02* (2013.01); *C08F 122/04* (2013.01); *C08F 122/06* (2013.01); *C08F 220/02* (2013.01); *C08F 220/04* (2013.01); *C08F 220/06* (2013.01); *C08F 220/62* (2013.01); *C08F 222/02* (2013.01); *C08F 271/02* (2013.01)

(58) Field of Classification Search
CPC ........ C08F 2/08; C08F 265/02; C08F 285/00; C08F 271/02; C08F 222/02; C08F 220/62; C08F 220/04; C08F 220/06; C08F 220/02; C08F 122/02; C08F 122/04; C08F 122/06; C08F 120/02; C08F 120/04; C08F 120/06; C08F 120/08; C08L 33/02; C08L 33/08; C08L 33/10; C08L 33/12; C08L 39/06
See application file for complete search history.

(56) References Cited

U.S. PATENT DOCUMENTS

| | | | |
|---|---|---|---|
| 3,116,248 A | 12/1963 | Frew | |
| 3,556,999 A | 1/1971 | Messina et al. | |
| 4,243,736 A * | 1/1981 | Herrmann | G03G 9/131 430/115 |
| 4,375,533 A | 3/1983 | Park et al. | |
| 4,419,502 A | 12/1983 | Sehm | |
| 4,420,596 A | 12/1983 | Lochhead et al. | |
| 4,526,937 A * | 7/1985 | Hsu | C08F 20/04 524/724 |

(Continued)

FOREIGN PATENT DOCUMENTS

| | | |
|---|---|---|
| EP | 1779896 A2 | 5/2007 |
| FR | 1322884 A1 | 4/1963 |
| WO | 2011086073 A2 | 7/2011 |

*Primary Examiner* — Ling Choi
*Assistant Examiner* — David L Miller
(74) *Attorney, Agent, or Firm* — Thoburn T. Dunlap

(57) ABSTRACT

A process for preparing a composition by free-radical polymerization of a monomer composition comprising: a) at least one ethylenically unsaturated carboxylic acid containing monomer or anhydride thereof; b) optionally at least one ethylenically unsaturated monomer different from a) but copolymerizable therewith; and c) at least one crosslinking monomer containing at least two ethylenically unsaturated groups. The monomer composition is polymerized in an organic medium having a solubilizing effect on one or more of the monomeric ingredients, but substantially none on the resulting polymer. The polymerization is conducted in the presence of a free radical forming catalyst and at least one steric stabilizing polymer polymerized from a vinyl lactam and a copolymerizable monomer selected from a short chain alkyl ester of (meth)acrylic acid, a long chain alkyl ester of (meth)acrylic acid, and combinations thereof.

36 Claims, 2 Drawing Sheets

(56) References Cited

U.S. PATENT DOCUMENTS

| | | |
|---|---|---|
| 4,636,452 A | 1/1987 | Furukawa et al. |
| 4,692,502 A | 9/1987 | Uebele et al. |
| 5,288,814 A | 2/1994 | Long, II et al. |
| 6,025,427 A * | 2/2000 | Cabrera .................... C08F 2/24 524/458 |
| 2005/0101721 A1 | 5/2005 | Shih |
| 2011/0150796 A1 | 6/2011 | Kim et al. |

* cited by examiner

METHOD OF PREPARING ACRYLIC POLYMERS AND PRODUCTS PRODUCED THEREBY

CROSS REFERENCE TO RELATED APPLICATION

This application claims priority from PCT Application Serial No. PCT/US2012/070113 filed on Dec. 17, 2012, which claims the benefit of U.S. Provisional Application No. 61/578,262 filed on Dec. 21, 2011.

FIELD OF THE INVENTION

The present invention relates generally to the preparation of carboxyl group containing polymers which can be employed as rheology modifiers (e.g., thickeners). In one aspect, the invention relates to a process for the preparation of crosslinked homopolymers and copolymers of acrylic acid by free radical polymerization in non-aqueous media in the presence of a steric stabilizer, to the stabilizers used therein and to the polymers obtained thereby.

BACKGROUND OF THE INVENTION

Poly(acrylic acid) homopolymer and copolymer rheology modifiers are often provided in solid, pulverulent form. They are used in many technical fields (e.g., coatings, paper production, textile industry, personal care, household care and in the pharmaceutical industry). These materials are conventionally prepared by polymerizing acrylic acid and an optional crosslinker (with or without other comonomers) with a free radical initiator in an organic medium contained in a reaction vessel equipped with stirring means. The organic medium is a solvent for the monomers but a substantially non-solvent for the resulting polymers. Shortly after the initiation of the polymerization reaction and during the course of the polymerization, nascent polymer particles begin to precipitate from the solution, flocculate and form aggregates. The precipitated polymer forms a slurry in the solvent which often becomes extremely viscous, resulting in ineffective mixing, restricting of monomer to free radicals, poor heat transfer, and polymer fouling on the reactor surfaces ultimately limiting the total solids level (i.e., polymer yield) that can be obtained in industrial scale production equipment. This condition can occur in many solvents at relatively low solids levels (e.g., 8 to 10%). An additional problem is that the solvent becomes entrained in the polymer during the aggregation of the particles making it difficult to obtain the desired dried polymer product, requiring excessive cycle time and energy consumption to remove the solvent in an environmentally acceptable way. An improved solvent polymerization system is desired.

Various processes have been proposed for producing particles of crosslinked acrylic polymers stably dispersed in an organic solvent. According to conventional processes, dispersed polymer particles are produced in the presence of a dispersion stabilizer polymer composed of a first segment which is solvated by the organic solvent employed in the reaction medium and a second segment which is substantially non-soluble in the organic solvent employed but serves as a portion that becomes "associated" to the dispersed polymer particles. The solvated segment of the dispersion stabilizer polymer extends sufficiently away from the polymer particle forming a steric repulsive barrier to prevent the aggregation or cohesion of individual polymer particles thereby stabilizing the polymer in dispersion. The associative force between the stabilizer and the disperse polymer may, for example, be a mass-dependent force generated between components of the stabilizer which are not solvated by the organic solvent and the disperse polymer (e.g., intermolecular entanglement). It may be a force generated by strong specific interaction between polar groups in the stabilizer and complementary polar groups in the disperse polymer (e.g., hydrogen bonding, Van der Walls forces). It may be the attraction between oppositely charged ionic groups in the stabilizer and in the dispersed polymer (e.g., ionic attraction). Alternatively, it may be a covalent bond between the non-solvated segment of the stabilizer and the disperse polymer (e.g., grafting, reaction via olefinic unsaturation in the non-solvated segment of the stabilizer reacting with the growing disperse polymer chain, condensation reaction, etc.).

U.S. Pat. No. 4,375,533 to Park et al. discloses a process for overcoming some of the foregoing problems. The Park et al. process for the polymerization of acrylic acid and optional comonomers in an organic media is characterized by the use of nonionic surface active agents having HLB values between 1 and about 10, including surface active agents containing poly(ethylene oxide) ether moieties.

Similarly, U.S. Pat. No. 4,419,502 to Sehm discloses a process for the polymerization of acrylic acid and optional comonomers in the presence of a nonionic surface active agent selected from polyoxyethylene alkyl ethers and polyoxyethylene sorbitol esters and having an HLB value greater than 12.

U.S. Pat. No. 4,420,596 to Lochhead et al. discloses a process for polymerizing carboxylic acids in mineral spirits. This process also employs nonionic surface active agents having HLB values less than 10. Among the disclosed surface active agents are (1) sorbitan ester, (2) glycerol or alkylene glycerol ester, and (3) long chained alcohols.

U.S. Pat. No. 4,526,937 to Hsu teaches the polymerization of acrylic acid in an organic solvent with a free radical catalyst. This process incorporates nonionic block copolymers of propylene oxide and ethylene oxide to minimize undesirable flocculation and agglomeration during the reaction process.

U.S. Pat. No. 4,692,502 to Uebele et al. discloses a process for the polymerization of unsaturated carboxyl containing monomers such as acrylic acid and optional comonomer in the presence of a free radical forming catalyst and at least one ionic surface active agent selected from anionic, cationic and amphoteric agents.

U.S. Pat. No. 5,288,814 to Long, I I et al. describes interpolymers of acrylic acid and optional comonomers which are polymerized in the presence of a steric stabilizer surfactant having at least one hydrophilic moiety and at least one hydrophobic moiety arranged in a linear block copolymer configuration or a random comb copolymer configuration. Both steric stabilizer polymer configurations contain hydrophilic moieties comprising polyoxyethylene ether groups. The solid acrylic based polymers obtained from the disclosed polymerization procedure are characterized by their ease of handling and the ability to be easily dispersed in aqueous media.

U.S. Patent Application Publication No. 2011/0150796 to Kim et al. discloses a process for preparing a crosslinked copolymer via free radical precipitation polymerization of a monomer composition containing acrylic acid and other copolymerizable monomers. The precipitation polymerization reaction is performed in the presence of at least two auxiliary components selected from glycerol monostearate and at least one compound having an HLB value ranging from 4 to 10, chosen from water insoluble waxes, nonionic emulsifiers and combinations thereof.

While the prior art has attempted to solve several of the inherent problems associated with polymerizing crosslinked acrylic based polymers in organic media, there is still a need for an efficient process for producing such polymers in high yield and without the excessive reaction media viscosity increases and concomitant reactor fouling. The polymer precipitate must be easily recoverable in powdered solid form in subsequent isolation steps and mucilages of these polymers must possess good clarity, structure (e.g., texture), and dissolution properties.

SUMMARY OF THE INVENTION

A general aspect of the present invention relates to a method for polymerizing a monomer composition comprising: a) at least one ethylenically unsaturated carboxylic acid containing monomer or anhydride thereof; b) optionally, at least one ethylenically unsaturated monomer different from a) but copolymerizable therewith; and c) optionally, at least one crosslinking monomer containing at least two ethylenically unsaturated groups. The monomer composition is polymerized in an organic medium having a solubilizing effect on one or more of the monomeric ingredients, but substantially none on the resulting polymer. The polymerization is conducted in the presence of a free radical forming catalyst and at least one steric stabilizing polymer which is polymerized in solution from a vinyl lactam and a copolymerizable monomer selected from a short chain alkyl ester of (meth)acrylic acid or amide, a long chain alkyl ester of (meth)acrylic acid or amide, and combinations thereof. The steric stabilizing polymer of the invention is nonionic and devoid of alkylene oxide or poly(alkylene oxide) moieties.

The use of the steric stabilizer according to the invention for the preparation of homopolymers and copolymers (optionally crosslinked) of at least one ethylenically unsaturated carboxylic acid containing monomer or anhydride thereof results in at least one of the following advantages: 1) the reaction mixture has a lower viscosity, meaning that the heat of reaction can be better dissipated; 2) higher solids contents (production yields) are possible; 3) the lower viscosity and/or the high solids contents render the process more economical; 4) polymer deposit formation in the polymerization reactor can generally be mitigated or avoided; and/or 5) mucilages formulated from the polymer product are characterized by at least one of the following properties: good clarity, good texture, and good dissolution properties.

DESCRIPTION OF EXEMPLARY EMBODIMENTS OF THE INVENTION

Figure 1:
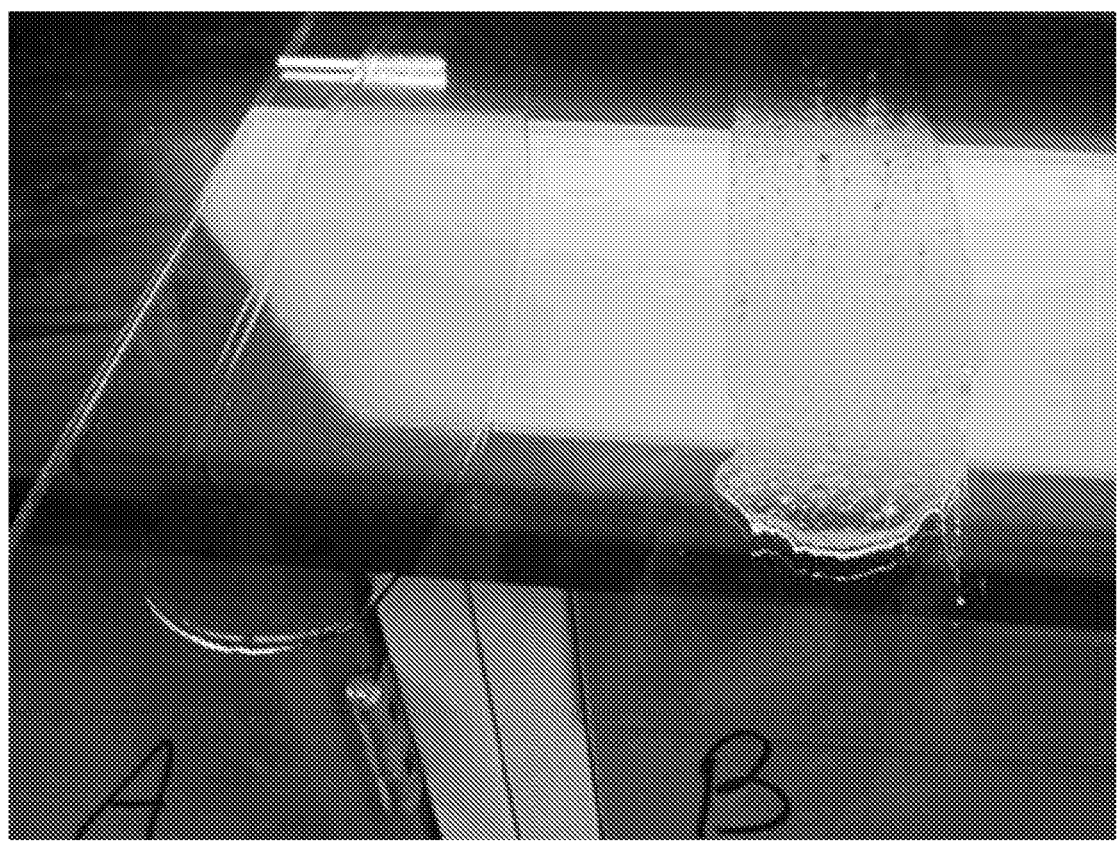
FIG. 1 is a photograph illustrating the results of a mucilage thin film drawn down test comparing films of a carboxyl group containing polymer prepared in the presence of a stabilizer of the present invention and a carboxyl group containing polymer prepared in the presence of a stabilizer systems of the prior art.

Exemplary embodiments in accordance with the present invention will be described. Various modifications, adaptations or variations of the exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

The methods, polymers and compositions of the present invention may suitably comprise, consist of, or consist essentially of the components, elements, steps, and process delineations described herein. The invention illustratively disclosed herein suitably may be practiced in the absence of any element which is not specifically disclosed herein.

Unless otherwise stated, all percentages, parts, and ratios expressed herein are based upon weight of the total compositions of the present invention.

When referring to a specified monomer(s) that is incorporated into a polymer of the invention, it will be recognized that the monomer(s) will be incorporated into the polymer as a unit(s) derived from the specified monomer(s) (e.g., repeating unit).

For the purpose of the specification, the prefix "(meth) acryl" includes "acryl" as well as "methacryl". For example, the term (meth)acrylic includes both acrylic and methacrylic, and the term (meth)acrylate includes acrylate as well as methacrylate. By way of further example, the term "(meth)acrylamide" includes both acrylamide and methacrylamide.

By "nonionic" is meant that a monomer, monomer composition or a polymer polymerized from a monomer composition is devoid of ionic or ionizable moieties ("nonionizable").

An ionizable moiety is any group that can be made ionic by neutralization with an acid or a base.

By "substantially nonionic" is meant that the monomer, monomer composition or polymer polymerized from a monomer composition contains less than 5 wt. % in one aspect, less than 3 wt. % in another aspect, less than 1 wt. % in a further aspect, less than 0.5 wt. % in a still further aspect, less than 0.1 wt. % in an additional aspect, and less than 0.05 wt. % in a further aspect, of an ionizable and/or an ionized moiety.

The term "personal care products" as used herein includes, without being limited thereto, cosmetics, toiletries, cosmeceuticals, beauty aids, insect repellents, personal hygiene and cleansing products applied to the body, including the skin, hair, scalp, and nails of humans and animals.

The term "home care products" as used herein includes, without being limited thereto, products employed in a domestic household for surface cleaning or maintaining sanitary conditions, such as in the kitchen and bathroom (e.g., hard surface cleaners, hand and automatic dish care, toilet bowl cleaners and disinfectants), and laundry products for fabric care and cleaning (e.g., detergents, fabric conditioners, pre-treatment stain removers), and the like.

The term "health care products" as used herein includes, without being limited thereto, pharmaceuticals (controlled release pharmaceuticals), pharmacosmetics, oral care (mouth and teeth) products, such as oral suspensions, mouthwashes, toothpastes, dentifrices, and the like, and over-the-counter products and appliances (topical and transdermal), such as patches, plasters and the like, externally applied to the body, including the skin, scalp, nails and mucous membranes of humans and animals, for ameliorating a health-related or medical condition, for generally maintaining hygiene or well-being, and the like.

The term "institutional and industrial care" ("I&I") as used herein includes, without being limited thereto, products employed for surface cleaning or maintaining sanitary conditions in institutional and industrial environments, textile treatments (e.g., textile conditioners, carpet and upholstery cleaners), automobile care (e.g., hand and automatic car wash detergents, tire shines, leather conditioners, liquid car polishes, plastic polishes and conditioners), paints and coatings, and the like.

As used herein, the term "rheological properties" and grammatical variations thereof, includes, without limitation such properties as Brookfield viscosity, increase or decrease in viscosity in response to shear stress, flow characteristics, gel properties such as stiffness, resilience, flowability, texture, and the like, foam properties such as foam stability, foam density, ability to hold a peak, and the like, suspension properties such as yield value, and aerosol properties such as ability to form aerosol droplets when dispensed from propellant based or mechanical pump type aerosol dispensers.

Here, as well as elsewhere in the specification and claims, individual numerical values (including carbon atom numerical values), or limits, can be combined to form additional non-disclosed and/or non-stated ranges.

The headings provided herein serve to illustrate, but not to limit the invention in any way or manner.

The preparation of the polymer compositions according to the invention takes place by precipitation polymerization. In the precipitation polymerization, the monomers used are soluble in the reaction medium (monomer solvent) but the corresponding polymer is not. The monomers are polymerized in the presence of a steric stabilizing polymer which is the product of copolymerizing a vinyl lactam monomer and at least one second monomer selected from a short chain alkyl ester of (meth)acrylic acid or amide, a long chain alkyl ester of (meth)acrylic acid or amide, and combinations thereof. The crosslinked acrylic polymer which forms becomes insoluble under the selected polymerization conditions and precipitates out of the reaction mixture. The process according to the invention is characterized by advantageous properties and leads to polymer compositions with particularly advantageous properties. An undesirably large increase in the viscosity of the reaction medium does not result during the polymerization reaction. Deposit formation on reactor surfaces is mitigated and usually is avoided. The precipitated polymer of the reaction is easily isolatable and dried to obtain a solid polymer product in powder form. The solid polymer compositions according to the invention are useful as rheology modifiers (specifically as thickeners). Mucilages of the neutralized polymer in water exhibit improved clarity and/or improved textural properties and/or improved dissolution properties compared with polymer mucilages based on conventionally prepared polymer compositions.

The free radically polymerizable monomer composition of the invention comprises: (a) at least one ethylenically unsaturated carboxylic acid containing monomer or anhydride thereof; optionally (b) at least one ethylenically unsaturated monomer different from (a) and copolymerizable therewith selected from least one alkyl ester of (meth)acrylic acid, at least one (meth)acrylamide, at least one aminoalkyl (meth)acrylate, at least one vinyl ester compound, at least one vinyl lactam compound, at least one vinyl aromatic compound, and mixtures thereof; and optionally (c) at least one crosslinking monomer containing at least two ethylenically unsaturated groups.

Monomer (a)

In one aspect, the polymers of the invention are cross-linked homopolymers or copolymers of carboxylic acids or anhydrides thereof. The carboxylic acid monomer is selected from at least one monoethylenically unsaturated carboxylic acid monomer containing at least one carboxyl group wherein the olefinic double bond is free radically polymerizable. Suitable monoethylenically unsaturated carboxylic acid monomers are selected from a monomer represented by formula I:

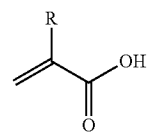

wherein R is selected from hydrogen, methyl, ethyl, halo (e.g., bromo, chloro, fluoro, iodo), cyano, cyclohexyl, phenyl, benzyl, tolyl, and xylyl. In one aspect R is hydrogen or methyl.

Representative monomers set forth under structure I include but are not limited to (meth)acrylic acids typified by the acrylic acid and methacrylic acid, ethacrylic acid, alpha-chloro acrylic acid, alpha-cyano acrylic acid, and alpha-phenyl acrylic acid.

As used herein, the term "carboxylic acid" includes the polycarboxylic acids and their acid anhydrides, wherein the anhydride group is formed by the elimination of one molecule of water from two carboxyl groups located on the same carboxylic acid molecule. Representative polycarboxylic acids include but are not limited to maleic acid, fumaric acid, citraconic acid, itaconic acid, and tricarboxy ethylene.

The acid anhydrides useful herein can be represented by formulas II and IIA:

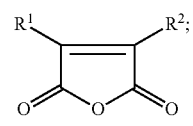

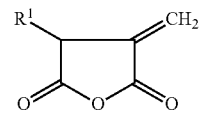

wherein $R^1$ and $R^2$ are independently selected from hydrogen, halogen cyano (—CN), alkyl, aryl, alkaryl, aralkyl, and cycloalkyl groups selected from methyl, ethyl, propyl, octyl, decyl, phenyl, tolyl, xylyl, benzyl, cyclohexyl, and the like. Representative acid anhydrides include but are not limited to maleic, itaconic, and citraconic anhydride.

Half esters of the condensation products of the dicarboxylic acids and acid anhydrides mentioned above with $C_1$ to $C_5$ alkanols are suitable components in the polymerizable monomer composition of the invention.

In another aspect, the carboxylic acid monomer is selected from at least one ethylenically unsaturated carboxylic acid monomer selected from aconitic acid, mesaconic acid, glutaconic acid, crotonic acid, beta-acryloxy propionic acid, cinnamic acid, and p-chloro cinnamic acid.

Monomer (a) also includes the salts of the respective carboxylic acids. Typical salts include sodium, potassium and amine salts. The carboxylic group containing monomers employed in the polymerizable monomer mixture can be pre-neutralized with a neutralization agent to a degree of neutralization ranging from 0.5 to about 10% in one aspect, from about 1 to about 5% in another aspect, and from about 1.5 to about 3% in a further aspect.

Monomer (b)

In one aspect, the polymers of the invention are cross-linked copolymers polymerized from a monomer composition comprising at least one carboxylic acid monomer or anhydrides thereof with at least one other ethylenically unsaturated monomer different than monomer (a) but copolymerizable therewith. In one aspect, monomer (b) includes, for example, at least one $C_1$ to $C_{30}$ alkyl ester of (meth)acrylic acid represented by formula III:

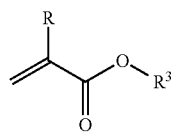

III wherein R is selected from hydrogen, methyl, ethyl, halo (e.g., bromo, chloro, fluoro, iodo), cyano, cyclohexyl, phenyl, benzyl, tolyl, and xylyl; $R^3$ is selected from linear and branched alkyl having from 1 to 30 carbon atoms. The alkyl moiety can be substituted with a halogen atom (e.g., bromo, chloro, fluoro, and iodo) and lower alkoxy (e.g., methoxy, ethoxy, propoxy).

In one aspect, the alkyl esters are selected from at least one $C_1$ to $C_9$ alkyl ester of (meth)acrylic acid, at least one $C_{10}$ to $C_{30}$ alkyl ester of (meth)acrylic acid, and mixtures thereof.

Representative $C_1$ to $C_9$ alkyl esters of (meth)acrylic acid which can be copolymerized with at least one of the carboxylic acid containing monomers or anhydrides thereof are selected from methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, heptyl (meth)acrylate, octyl (meth)acrylate, 2-ethylhexyl (meth)acrylate, nonyl (meth)acrylate, and the like.

Representative $C_{10}$ to $C_{30}$ alkyl esters of (meth)acrylic acid which can be copolymerized with at least one of the carboxylic acid containing monomers or anhydrides thereof are selected from decyl (meth)acrylate, isodecyl (meth)acrylate, lauryl (meth)acrylate, cetyl (meth)acrylate, stearyl (meth)acrylate, behenyl (meth)acrylate and melissyl (meth)acrylate. Mixtures of $C_1$ to $C_9$ alkyl esters of (meth)acrylic acid and $C_{10}$ to $C_{30}$ alkyl esters of (meth)acrylic acid can be polymerized with at least one of the carboxylic monomers (a).

Other copolymerizable acrylates include, for example, the cyanoalkyl acrylates such as α-cyanomethyl acrylate, and the α-, β-, and γ-cyanopropyl acrylates; alkoxyacrylates such as methoxy ethyl acrylate; and haloacrylates as chloroethyl acrylate; vinyl halides such as vinyl chloride, vinylidene chloride and the like; and vinyl aromatics such as styrene, methyl styrene and chlorostyrene.

In another aspect monomer (b) includes at least one (meth)acrylamide represented by formula IV:

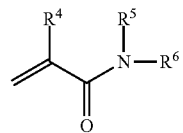

IV wherein $R^4$ is selected from hydrogen and methyl; and $R^5$, $R^6$, independently, are selected from hydrogen and $C_1$-$C_5$ alkyl; $R^5$, $R^6$ taken together with the nitrogen atom to which they are attached form a heterocyclic ring containing 3 to 5 carbon atoms and, optionally a heteroatom selected from N, O, and S. Representative heterocyclic ring moieties include, but are not limited to, imidazolinyl, oxazolinyl, piperidinyl, morpholinyl, and thiazolidinyl.

Representative copolymerizable (meth)acrylamides include, for example, N-methyl(meth)acrylamide, N-ethyl (meth)acrylamide, N-propyl(meth)acrylamide, N-(butyl)(meth)acrylamide, N-tert-butyl(meth)acrylamide, n-pentyl (meth)acrylamide, n-hexyl(meth)acrylamide, n-heptyl (meth)acrylamide, N,N-dimethyl(meth)acrylamide, N,N-diethyl(meth)acrylamide, piperidinyl(meth)acrylamide, morpholinyl(meth)acrylamide.

In another aspect, monomer (b) is a N—($C_1$-$C_5$)alkylamino($C_1$-$C_5$)alkyl(meth)acrylamide or N,N-di($C_1$-$C_5$)alkylamino($C_1$-$C_5$)alkyl(meth)acrylamide represented by formula IVA:

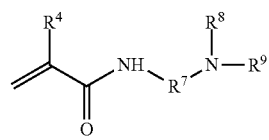

IVA wherein $R^4$ is as defined above; $R^7$ is $C_1$ to $C_5$ alkylene; and $R^8$, $R^9$, independently, are selected from hydrogen and $C_1$-$C_5$ alkyl.

Representative copolymerizable N—($C_1$-$C_5$)alkylamino ($C_1$-$C_5$)alkyl(meth)acrylamides are selected from, but are not limited to, N-methylamino methyl (meth)acrylamide, N-methylamino ethyl (meth)acrylamide, N-ethylamino methyl (meth)acrylamide, N-ethylamino ethyl (meth)acrylamide, N-propylamino methyl (meth)acrylamide, N-propylamino ethyl (meth)acrylamide, N-butylamino methyl (meth)acrylamide, N-butylamino ethyl (meth)acrylamide, N-pentylamino methyl (meth)acrylamide, N-pentylamino ethyl (meth)acrylamide, N-methylamino ethyl (meth)acrylamide, N-methylamino propyl (meth)acrylamide, N-ethylamino ethyl (meth)acrylamide, N-ethylamino propyl (meth)acrylamide, N-propylamino ethyl (meth)acrylamide, N-propylamino propyl (meth)acrylamide, N-butylamino ethyl (meth)acrylamide, N-butylamino propyl (meth)acrylamide, N-pentylamino ethyl (meth)acrylamide, N-pentylamino propyl (meth)acrylamide, N-methylamino ethyl (meth)acrylamide, N-methylamino butyl (meth)acrylamide, N-ethylamino ethyl (meth)acrylamide, N-ethylamino butyl (meth)acrylamide, N-propylamino ethyl (meth)acrylamide, N-propylamino butyl (meth)acrylamide, N-butylamino ethyl (meth)acrylamide, N-butylamino butyl acrylamide, N-pentylamino ethyl (meth)acrylamide, and N-pentylamino butyl (meth)acrylamide.

Representative copolymerizable N,N-dialkylaminoalkyl (meth)acrylamides are selected from, but are not limited to, N,N-di-methylamino methyl (meth)acrylamide, N,N-dimethylamino ethyl (meth)acrylamide, N,N-di-ethylamino methyl acrylamide, N,N-di-ethylamino ethyl (meth)acrylamide, N,N-di-propylamino methyl (meth)acrylamide, N,N-di-propylamino ethyl (meth)acrylamide, N,N-di-butylamino methyl (meth)acrylamide, N,N-di-butylamino ethyl (meth)acrylamide, N,N-di-pentylamino methyl (meth)acrylamide, N,N-di-pentylamino ethyl (meth)acrylamide, N,N-di-methylamino ethyl (meth)acrylamide, N,N-di-methylamino propyl (meth)acrylamide, N,N-di-ethylamino ethyl (meth)acrylamide, N,N-di-ethylamino propyl (meth)acrylamide, N,N-di-propylamino ethyl (meth)acrylamide, N,N-di-propylamino propyl acrylamide, N,N-di-butylamino ethyl (meth)acrylamide, N,N-di-butylamino propyl (meth)acrylamide, N,N-di-pentylamino ethyl (meth)acrylamide, N,N-di-pentylamino propyl (meth)acrylamide, N,N-di-methylamino ethyl (meth)acrylamide, N,N-di-methylamino butyl (meth)acrylamide, N,N-di-ethylamino ethyl (meth)acrylamide, N,N-di-ethylamino butyl (meth)acrylamide, N,N-di-propylamino ethyl (meth)acrylamide, N,N-di-propylamino butyl (meth)acrylamide, N,N-di-butylamino ethyl (meth)acrylamide, N,N-di-butylamino butyl (meth)acrylamide, N,N-di-pentylamino ethyl (meth)acrylamide, and N,N-di-pentylamino butyl (meth)acrylamide.

In another aspect, monomer (b) includes at least one aminoalkyl ester or a half ester of a monoethylenically unsaturated carboxylic acid or anhydride which can be obtained, for example, by the esterification of the ethylenically unsaturated monocarboxylic acids, polycarboxylic acids or anhydrides described under monomer (a) with an aminoalkyl alcohol. In one aspect, the aminoalkyl alcohol contains a linear or branched $C_2$-$C_{12}$ alkylene moiety situated between terminal amino and hydroxyl moieties. The amine moiety can be a $C_1$-$C_5$ monoalkyl or $C_1$-$C_5$ dialkyl amine. In one aspect, suitable monomers are obtained by esterifying (meth)acrylic acid, fumaric acid, maleic acid, itaconic acid, crotonic acid, or maleic anhydride with the aminoalcohol described above.

In one aspect, monomer (b) is an aminoalkyl (meth)acrylate obtained by esterifying (meth)acrylic acid with an amino alkanol to give an aminoalkyl (meth)acrylate monomer represented by formula V:

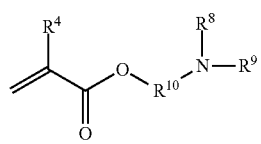

V wherein $R^4$, $R^8$, and $R^9$ are as defined above; and $R^{10}$ is a linear, branched, or cyclo alkylene moiety containing 2 to 12 carbon atoms. Copolymerizable monomers include, for example, N-methylaminoethyl (meth)acrylate, N-ethylaminoethyl (meth)acrylate, N-propylaminoethyl (meth)acrylate, N-butylaminoethyl methacrylate, N-(t-butyl)aminoethyl (meth)acrylate, N,N-dimethylaminomethyl (meth)acrylate, N,N-dimethylaminoethyl (meth)acrylate, N,N-diethylaminomethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoneopentyl (meth)acrylate and N,N-dimethylaminocyclohexyl (meth)acrylate.

In another aspect, monomer (b) is selected from a vinyl ester of an aliphatic carboxylic acid that contains 1 to 22 carbon atoms such monomers are be represented by formula VI:

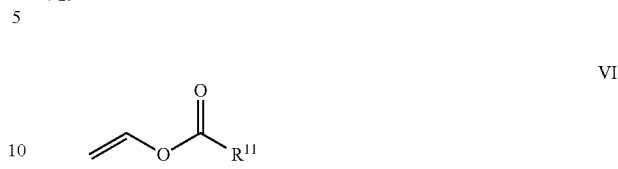

VI wherein $R^{11}$ is a $C_1$ to $C_{22}$ linear or branched alkyl group. Representative monomers under formula (V) include but are not limited to vinyl acetate, vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neodecanoate, vinyl decanoate, vinyl versatate, vinyl laurate, vinyl palmitate, vinyl stearate, and vinyl behenate.

In another aspect, monomer (b) is selected from a vinyl lactam represented by formula VII:

VII wherein Y is an alkylene moiety containing 3 to 7 carbon atoms, wherein each carbon atom optionally can be mono-substituted or disubstituted with an alkyl group containing 1 to 5 carbon atoms. Representative substituents include but are not limited to methyl, ethyl, propyl, isopropyl, butyl, and pentyl.

Representative N-vinyl lactams include N-vinyl-2-pyrrolidinone (N-vinyl pyrrolidone), N-(1-methyl vinyl) pyrrolidinone, N-vinyl-2-piperidone, N-vinyl-2-caprolactam, N-vinyl-5-methyl pyrrolidinone, N-vinyl-3,3-dimethyl pyrrolidinone, N-vinyl-5-ethyl pyrrolidinone, N-vinyl-6-methyl piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, and N-vinyl-3,5,7-trimethyl-2-caprolactam.

In another aspect, monomer (b) is selected from vinyl aromatic compounds such as styrene, methyl styrene and chlorostyrene.

Crosslinking Monomer (c)

The optional crosslinking monomer (c) is a compound having two or more ethylenically unsaturated, nonconjugated double bonds. Exemplary polyunsaturated crosslinking monomer components include di(meth)acrylate compounds such as ethylene glycol di(meth)acrylate, polyethylene glycol di(meth)acrylate, triethylene glycol di(meth)acrylate, 1,3-butylene glycol di(meth)acrylate, 1,6- butylene glycol di(meth)acrylate, 1,6-hexanediol di(meth)acrylate, neopentyl glycol di(meth)acrylate, 1,9-nonanediol di(meth)acrylate, 2,2'-bis(4-(acryloxy-propyloxyphenyl)propane, and 2,2'-bis(4-(acryloxydiethoxy-phenyl)propane; tri(meth)acrylate compounds such as, trimethylolpropane tri(meth)acrylate, trimethylolethane tri(meth)acrylate, and tetramethylolmethane tri(meth)acrylate; tetra(meth)acrylate compounds such as ditrimethylolpropane tetra(meth)acrylate, tetramethylolmethane tetra(meth)acrylate, and pentaerythritol tetra(meth)acrylate; hexa(meth)acrylate compounds such as dipentaerythritol hexa(meth)acrylate; allyl compounds such as allyl (meth)acrylate, diallylphthalate, diallyl itaconate, diallyl fumarate, and diallyl maleate; polyallyl ethers of sucrose having from 2 to 8 allyl groups per molecule, polyallyl ethers of pentaerythritol such as pentaerythritol diallyl ether, pentaerythritol triallyl ether, and pentaerythritol tetraallyl ether, and combinations thereof; polyallyl ethers of trimethylolpropane such as trimethylolpropane diallyl ether, trimethylolpropane triallyl ether, and combinations thereof. Other suitable polyunsaturated compounds include divinyl glycol, divinyl benzene, and methylenebisacrylamide.

When homopolymers prepared from the ethylenically unsaturated carboxylic acid containing monomer or anhydride are contemplated, the amount of monomer (a) in the polymerizable monomer mixture ranges from about 95 to about 99.99 wt. %, and the amount of optional crosslinking monomer (c) ranges from about 0.01 to about 5 wt. % based on the total weight of monomers in the polymerizable monomer mixture. In another aspect, the amount of optional crosslinking monomer (c) in the polymerizable monomer mixture can range from about 0.05 to about 4 wt. %, from about 0.1 to about 3.5 wt. %, and from about 1 to about 2.5 wt. % with the balance made up by the ethylenically unsaturated carboxylic acid containing monomer (a) to total 100 wt. %.

When copolymers prepared from the ethylenically unsaturated carboxylic acid containing monomer or anhydride are contemplated, the amount of monomer (a) in the polymerizable monomer mixture ranges from about 60 to about 99 wt. %, the amount of copolymerizable monomer (b) that is different than monomer (a) ranges from about 1 to about 40 wt. %, and the amount of optional crosslinking monomer (c) ranges from about 0.01 to about 5 wt. % based on the total weight of monomers in the polymerizable monomer mixture. In another aspect, the amount of optional crosslinking monomer (c) in the polymerizable monomer mixture can range from about 0.05 to about 4 wt. %, from about 0.1 to about 3.5 wt. %, and from about 1 to about 2.5 wt. % with the balance made up by the ethylenically unsaturated carboxylic acid containing monomer (a) and/or the amount of copolymerizable monomer (b) that is different than monomer (a) to total 100 wt. %.

In another aspect, the polymerizable monomer mixture comprises from about 70 to about 97 wt. % of the ethylenically unsaturated carboxylic acid containing monomer or anhydride (a), from about 3 to about 30 wt. % of the copolymerizable monomer (b) that is different than monomer (a), and from about 0.01 to about 5 wt. % of the optional crosslinking monomer (c) based on the total weight of monomers in the polymerizable monomer mixture. In another aspect, the amount of optional crosslinking monomer (c) in the polymerizable monomer mixture can range from about 0.05 to about 4 wt. %, from about 0.1 to about 3.5 wt. %, and from about 1 to about 2.5 wt. % with the balance made up by the ethylenically unsaturated carboxylic acid containing monomer (a) and/or the amount of copolymerizable monomer (b) that is different than monomer (a) to total 100 wt. %.

In another aspect, the polymerizable monomer composition comprises: (a) from about 60 to about 99 wt. % (meth)acrylic acid, (b) from about 1 to about 40 wt. % of at least one monomer selected from a $C_1$ to $C_{30}$ alkyl ester of (meth)acrylic acid, and (c) from about 0.01 to about 5 wt. % of an optional crosslinking monomer. In another aspect, the amount of optional crosslinking monomer (c) in the polymerizable monomer mixture can range from about 0.05 to about 4 wt. %, from about 0.1 to about 3.5 wt. %, and from about 1 to about 2.5 wt. % with the balance made up by the at least one monomer selected from a $C_1$ to $C_{30}$ alkyl ester of (meth)acrylic acid to total 100 wt. %. In this aspect, the polymerizable monomer composition can further comprise 0 to 10 wt. % of monomer (b) selected from at least one (meth)acrylamide, at least one aminoalkyl (meth)acrylate, at least one vinyl ester compound, at least one vinyl lactam compound, at least one vinyl aromatic compound, and mixtures thereof.

In another aspect, the polymerizable monomer composition comprises: (a) from about 70 to about 97 wt. % (meth)acrylic acid, (b) from about 3 to about 30 wt. % of at least one monomer selected from a $C_1$ to $C_{30}$ alkyl ester of (meth)acrylic acid, and (c) from about 0.01 to about 5 wt. % of a crosslinking monomer. In another aspect, the amount of crosslinking monomer (c) in the polymerizable monomer mixture can range from about 0.05 to about 4 wt. %, from about 0.1 to about 3.5 wt. %, and from about 1 to about 2.5 wt. % with the balance made up by the at least one monomer selected from a $C_1$ to $C_{30}$ alkyl ester of (meth)acrylic acid to total 100 wt. %. In this aspect, the polymerizable monomer composition can further comprise 0 to 10 wt. % of monomer (b) selected from at least one (meth)acrylamide, at least one aminoalkyl (meth)acrylate, at least one vinyl ester compound, at least one vinyl lactam compound, at least one vinyl aromatic compound, and mixtures thereof.

In the foregoing aspects of the invention wherein the polymerizable monomer mixture comprises (meth)acrylic acid (monomer (a)) and a $C_1$ to $C_{30}$ alkyl ester of (meth)acrylic acid (monomer (b)), monomer (b) is selected from at least one $C_1$ to $C_9$ alkyl ester of (meth)acrylic acid, at least one $C_{10}$ to $C_{30}$ alkyl ester of (meth)acrylic acid, and mixtures thereof. In one aspect the at least one $C_1$ to $C_9$ alkyl ester of (meth)acrylic acid is selected from methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, heptyl (meth)acrylate, octyl (meth)acrylate, 2-ethylhexyl (meth)acrylate, nonyl (meth)acrylate, and the at least one $C_{10}$ to $C_{30}$ alkyl ester of (meth)acrylic acid is selected from decyl (meth)acrylate, isodecyl (meth)acrylate, lauryl (meth)acrylate, cetyl (meth)acrylate, stearyl (meth)acrylate, behenyl (meth)acrylate, and melissyl (meth)acrylate.

As one of ordinary skill in the art will readily recognize the amounts of monomer (a), monomer (b), and monomer (c) set forth herein will be selected from the disclosed ranges such that the sum of each of the monomer components in the polymerizable monomer compositions is equal to 100 wt. % of the polymerizable monomer mixture.

Stabilizer Polymer

The present invention provides polymeric substances as stabilizers for dispersions of polymers in organic media. In one aspect, the polymeric stabilizer is a nonionic linear copolymer which is devoid of ethylene oxide moieties. The copolymer is prepared by solution polymerization in an organic solvent a monomer mixture comprising at least one monomer selected from an least one alkyl ester of (meth) acrylic acid and/or at least one N-alkyl substituted (meth) acrylamide selected from formula VIII:

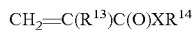　　　　　VIII wherein $R^{13}$ is selected from hydrogen and methyl, $R^{14}$ is selected from a linear or branched alkyl group containing 1 to 30 carbon atoms, and X represents O or NH.

In one aspect, the copolymeric stabilizer is prepared from a monomer mixture comprising at least one N-vinyl lactam and at least one alkyl (meth)acrylate and/or at least one N-alkyl substituted (meth)acrylamide of formula VIII, wherein $R^{14}$ is selected from a short chain alkyl moiety, a long chain alkyl moiety, and mixtures thereof. By "short chain" alkyl moiety is meant a linear or branched alkyl group containing 1 to 9 carbon atoms in one aspect, 1 to 7 carbon atoms in another aspect, and 2 to 5 carbon atoms in a further aspect. By "long chain" alkyl moiety is meant a linear or branched alkyl group containing 10 to 30 carbon atoms in one aspect, 10 to 22 carbon atoms in another aspect, and 12 to 18 carbon atoms in further aspect.

Suitable short chain alkyl groups include, but are not limited to, methyl, ethyl, propyl, isopropyl, n-butyl, 2-butyl, sec-butyl, tert-butyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 2-ethylhexyl, 1-propylbutyl, n-octyl, and n-nonyl.

Suitable long chain alkyl groups include, but are not limited to, n-decyl, isodecyl, n-undecyl, n-dodecyl (lauryl), n-tridecyl, n-tetradecyl (myristyl), n-pentadecyl, n-hexadecyl (cetyl), n-heptadecyl, n-octadecyl (stearyl), isostearyl, n-nonadecyl, arachinyl, heneicosyl, behenyl, lignoceryl, ceryl, montanyl, and melissinyl.

In another aspect, the alkyl group of the alkyl esters of (meth)acrylic acid can be derived from a Guerbet alcohol represented by the formula $(R')(R'')CHCH_2OH$, wherein R' is selected from a moiety represented by the radical $CH_3(CH_2)_x-$ and R" is selected from a moiety represented by the radical $CH_3(CH_2)_y-$, and y is an integer ranging from 5 to 19, and x is an integer ranging from 3 to 17 subject to the proviso that $x=y+2$. The Guerbet alcohol can be reacted with (meth)acrylic acid under conditions suitable esterification conditions known in the art. Guerbet alcohols containing 12 to 32 carbon atoms are commercially available under the Isofol® trademark from Sasol North America Inc.

Representative N-vinyl lactams contain 5 to 9 atoms in the lactam ring moiety, wherein the ring carbon atoms optionally can be substituted by one or more lower alkyl groups such as methyl, ethyl or propyl. In one aspect, the N-vinyl lactam can be represented by formula IX:

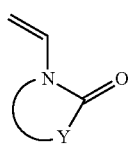　　　　　IX wherein Y is an alkylene moiety containing 3 to 7 carbon atoms, wherein each carbon atom optionally can be monosubstituted or disubstituted with an alkyl group containing 1 to 5 carbon atoms. Representative substituents include but are not limited to methyl, ethyl, propyl, isopropyl, butyl, and pentyl.

Representative N-vinyl lactams include N-vinyl-2-pyrrolidinone (N-vinyl pyrrolidone), N-(1-methyl vinyl) pyrrolidinone, N-vinyl-2-piperidone, N-vinyl-2-caprolactam, N-vinyl-5-methyl pyrrolidinone, N-vinyl-3,3-dimethyl pyrrolidinone, N-vinyl-5-ethyl pyrrolidinone, N-vinyl-6-methyl piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, and N-vinyl-3,5,7-trimethyl-2-caprolactam.

The amount of the at least one N-vinyl lactam ranges from about 32 to about 82 mol. % and the amount of the at least one at least one alkyl (meth)acrylate and/or the at least one N-alkyl substituted (meth)acrylamide ranges from about 68 to about 18 mol. % based on the total molar amount of monomers in the monomer mixture. In another aspect, the amount of the at least one N-vinyl lactam ranges from about 38 to about 72 mol. % and the at least one alkyl (meth) acrylate and/or the at least one N-alkyl substituted (meth) acrylamide ranges from about 62 to about 28 mol. %, and in a further aspect, the amount of the at least one N-vinyl lactam ranges from about 55 to about 70 mol. %, and the at least one alkyl (meth)acrylate and/or the at least one N-alkyl substituted (meth)acrylamide ranges from about 45 to about 30 mol. % based on the total molar amount of monomers in the monomer mixture. When long chain alkyl esters of (meth)acrylic acid and/or long chain N-alkyl substituted (meth)acrylamides are present in the monomer mixture, the molar ratio of long chain alkyl esters of (meth)acrylic acid and/or long chain N-alkyl substituted (meth)acrylamide to N-vinyl lactam is 0.11 in one aspect, 0.2 to 2 in another aspect, 0.3 to 1.6 in a further aspect, and 0.4 to 0.75 in a still further aspect.

In one aspect, the stabilizer polymer is prepared by polymerizing a monomer mixture comprising N-vinyl pyrrolidone and a mixture of short and long chain alkyl esters of (meth)acrylic acid and/or a mixture of short and long chain N-alkyl substituted (meth)acrylamides, wherein the amount of N-vinyl pyrrolidone present in the monomer mixture ranges from about 32 to about 82 mol. % and the amount of short chain and long chain alkyl esters of (meth) acrylic acid and/or short chain and long chain N-alkyl substituted (meth)acrylamides present in the monomer mixture ranges from about 68 to about 18 mol. % based on the total molar amount of monomers in the monomer mixture. In one aspect, the amount of N-vinyl pyrrolidone present in the monomer mixture ranges from about 38 to about 72 mol. % and the amount of short chain and long chain alkyl esters of (meth)acrylic acid and/or short chain and long chain N-alkyl substituted (meth)acrylamides present in the monomer mixture ranges from about 62 to about 28 mol. % based on the total molar amount of monomers in the monomer mixture. In one aspect the amount of N-vinyl pyrrolidone present in the monomer mixture ranges from about 55 to about 70 mol. % and the amount of short chain and long chain alkyl esters of (meth)acrylic acid and/or short chain and long chain N-alkyl substituted (meth)acrylamides present in the monomer mixture ranges from about 45 to about 30 mol. % based on the total molar amount of monomers in the monomer mixture. The molar ratio of long chain alkyl esters of (meth)acrylic acid and/or long chain N-alkyl substituted (meth)acrylamide to N-vinyl pyrrolidone in the monomer mixture is 0.11 in one aspect, from about 0.2 to about 2 in another aspect, from about 0.3 to about 1.6 in a further aspect, and from about 0.4 to about 0.75 in a still further aspect.

In one aspect, the short chain alkyl ester of (meth)acrylic acid is selected from ethyl (meth)acrylate, propyl (meth)acrylate, butyl (meth)acrylate, and mixtures thereof. In one aspect, the short chain alkyl ester is selected from ethyl acrylate, ethyl methacrylate, propyl acrylate, propyl methacrylate, isopropyl acrylate, isopropyl methacrylate, butyl acrylate, butyl methacrylate, and mixtures thereof.

In one aspect, the short chain N-alkyl substituted (meth)acrylamide is selected from N-methyl (meth)acrylamide, N-ethyl (meth)acrylamide, N-propyl (meth)acrylamide, N-butyl (meth)acrylamide, N-tert-butyl (meth)acrylamide, N-pentyl (meth)acrylamide, N-hexyl (meth)acrylamide, N-heptyl (meth)acrylamide, N-nonyl (meth)acrylamide, and mixtures thereof.

In one aspect, mixtures of the short chain alkyl ester of (meth)acrylic acid monomers and short chain N-alkyl substituted (meth)acrylamide monomers mentioned above can be utilized.

In one aspect, the long chain alkyl ester of (meth)acrylic acid is selected from lauryl (meth)acrylate, cetyl (meth)acrylate, stearyl (meth)acrylate, and behenyl (meth)acrylate, and mixtures thereof. In one aspect the long chain alkyl ester is selected from lauryl acrylate, lauryl methacrylate, cetyl acrylate, cetyl methacrylate, stearyl acrylate, stearyl methacrylate, and mixtures thereof.

In one aspect, the long chain N-alkyl substituted (meth)acrylamide is selected from selected from N-decyl (meth)acrylamide, N-undecyl (meth)acrylamide, N-dodecyl (meth)acrylamide, N-tetradecyl (meth)acrylamide, N-hexadecyl (meth)acrylamide, N-octadecyl (meth)acrylamide, N-isostearyl (meth)acrylamide, N-arachidyl (meth)acrylamide, N-docosanyl (meth)acrylamide, and mixtures thereof.

In one aspect, mixtures of the long chain alkyl ester of (meth)acrylic acid monomers and long chain N-alkyl substituted (meth)acrylamide monomers mentioned above can be utilized.

In one aspect, the polymeric stabilizer is prepared by polymerizing in an organic solvent a monomer mixture comprising N-vinyl pyrrolidone, butyl acrylate, and a long chain alkyl acrylate selected from lauryl methacrylate, myristyl methacrylate, cetyl methacrylate, stearyl methacrylate, isostearyl methacrylate, behenyl methacrylate, and mixtures thereof.

Preparation of Stabilizer Polymer

In one aspect, the stabilizer polymer component of the invention is prepared by conventional free radical solution polymerization of the monomer constituents previously described. Monomers are first dissolved in an organic solvent and subsequently polymerized utilizing a suitable free radical initiator which can be either thermally or photochemically activated. Initiators for the free radical polymerization reaction which can be used are the organic peroxides and hydroperoxides and/or azo compounds customary employed for this purpose. Redox initiator systems can be employed as well. The initiators can be used in amounts up to 15 wt. % in one aspect, from 0.01 to 10 wt. % in another aspect, and from 0.2 to 5 wt, % in a further aspect, based on the total weight of the monomers to be polymerized. For initiators consisting of two or more constituents (e.g., in the case of redox initiator systems), the weights given above refer to the sum of the initiator components.

Exemplary initiators are, but are not limited to, hydrogen peroxide, diacetyl peroxide, di-tert-butyl peroxide, diamyl peroxide, dioctanoyl peroxide, didecanoyl peroxide, dilauroyl peroxide, dibenzoyl peroxide, bis(o-tolyl)peroxide, succinyl peroxide, methyl ethyl ketone peroxide, di-tert-butyl hydroperoxide, acetylacetone peroxide, di(n-propyl) peroxydicarbonate, di(iso-propyl) peroxydicarbonate, di(sec-butyl) peroxydicarbonate, di-(2-ethylhexyl) peroxydicarbonate, di(cyclohexyl) peroxydicarbonate, di(cetyl) peroxydicarbonate, butyl peracetate, tert-butyl permaleinate, tert-butyl perisobutyrate, tert-butyl perpivalate, tert-butyl peroctoate, tert-butyl perneodecanoate, tert-butyl perbenzoate, tert-butyl hydroperoxide, cumene hydroperoxide, tert-butyl perneodecanoate, tert-amyl perpivalate, tert-butyl perpivalate, tert-butyl perbenzoate, tert-butyl peroxy-2-ethylhexanoate and diisopropyl peroxydicarbamate; also lithium, sodium, potassium and ammonium peroxodisulfate, 2,2'-azobisisobutyronitrile, 2,2'-azobis(2-methylbutyronitrile), 2,2'-azobis[2-methyl-N-(2-hydroxyethyl)]propionamide, 1,1'-azobis(1-cyclohexanecarbonitrile), 2,2'-azobis(2,4-dimethylvaleronitrile), 2,2'-azobis(N,N'-dimethyleneisobutyroamidine)dihydrochloride, and 2,2'-azobis(2-amidinopropane) dihydrochloride; and mixtures thereof. In one aspect, the initiator is selected from di-(2-ethylhexyl)peroxydicarbonate, dilauroyl peroxide, and mixtures thereof.

Redox initiator systems comprise at least one oxidizing, generally a peroxide compound and at least one reducing compound, for example, a reducing sulfur compound, selected from bisulfites, sulfites, thiosulfates, dithionites, tetrathionates of alkali metals or ammonium salts thereof or an organic reducing agent, such as benzoine, dimethylaniline, ascorbic acid, hydroxymethanesulfinates, and adducts of hydrogensulfite onto ketones, such as, for example, the acetone-bisulfite adduct.

The solvent used in the solution polymerization process include liquid hydrocarbon solvents and liquid organic solvents which form a solution with the monomers and the polymers prepared therefrom. Representative hydrocarbon solvents include, but are not limited to, aromatic and substituted aromatic hydrocarbons such as benzene, ethylbenzene, toluene, xylene or the like; substituted or unsubstituted, straight or branched chain saturated aliphatics hydrocarbons of 5 or more carbon atoms, such as pentanes, hexanes, heptanes, octanes, and the like; saturated alicyclic or substituted alicyclic hydrocarbons having 5 to 8 carbon atoms, such as cycloalkanes selected from cyclopentane, cyclohexane, cycloheptane, and cyclooctane, and the like; chlorinated hydrocarbons such as methylene chloride, chloroform, ethylene dichloride, 1,1,1-trichloroethane, trichloroethylene, perchloroethylene, and the like.

Representative organic solvents include, but are not limited to, alkyl esters such as methyl acetate, ethyl acetate, propyl acetate, isopropyl acetate, butyl acetate, and butyl propionate; ketones such as methyl ethyl ketone and cyclohexanone, and the like.

Mixtures of the hydrocarbon solvent(s) and the organic solvent(s) can be utilized in the polymerization medium. The mixed solvent system can be premixed and the mixed reaction medium can be used in the polymerization reaction. The hydrocarbon solvent(s) and the organic solvent(s) can also be added separately to the reaction mixture and the polymerization reaction can be carried out thereafter. Whether the components of the reaction medium are premixed or are added separately to a reaction mixture is immaterial as long as the polymerization reaction is carried out in the presence of at least one organic solvent and at least one hydrocarbon solvent.

The amount of the hydrocarbon solvent, organic solvent or mixed hydrocarbon/organic solvent will normally be in excess of the monomer or monomers to be polymerized, and the proportion may vary from at least 1 wt. % monomers and 99 wt. % solvent to 50% monomers and 50% solvent. The amount of solvent used in the polymerization medium can range from about 50 to about 99 wt. % in one aspect, from about 55 to about 90 wt. % in another aspect, and from about 60 to about 70 wt. % in a further aspect, based on the total weight of the monomers to be polymerized and solvent.

In mixed hydrocarbon/organic solvent systems, the relative weight ratio of the at least one hydrocarbon solvent to the at least one organic solvent can be in the range of from about 95/5 to about 5/95 in one aspect, from about 80/20 to about 20/80 in another aspect, and from about 70/30 to about 30/70 in another aspect. In one aspect, the mixed hydrocarbon/organic solvent system comprises a cycloalkane and an alkyl ester. In one aspect, the mixed solvent system comprises cyclohexane and ethyl acetate.

The monomers are dissolved in the desired solvent system and subsequently polymerized utilizing a free radical initiator. Polymerization of the monomer in the reaction medium is usually carried out in a closed vessel in an inert atmosphere and under atmospheric pressure, although it can proceed under reduced or elevated pressure, or in an open vessel under reflux at atmospheric pressure under an inert gaseous blanket. The temperature of the polymerization may be varied between about 0 and about 100° C. in one aspect, from about 40 to about 85° C. in another aspect, from about 45 to about 60° C. in a further aspect, and from about 70 to about 80° C. in a still further aspect, depending on the type of initiator selected.

To obtain a polymer product with low residual monomer content, the initial polymerization step can be followed by a subsequent polymerization step. The subsequent polymerization step can take place in the presence of the same initiator system as employed in the initial polymerization or a different initiator system can be added. The subsequent polymerization step can be carried out at the same temperature as the initial polymerization or at a higher temperature. The initiator(s) will be sufficiently decomposed following its use in driving additional polymerization so little or no undesirable material is present in the polymer solution product. The total solids (active polymer) content of the polymer solution can range from about 25 to about 35 wt. % in one aspect, from about 28 to about 33 wt. % in another aspect, and about 30 wt. % in a further aspect, based on the weight of polymer and solvent.

The stabilizers are linear random copolymers having a weight average molecular weight ranging from about 5,000 to about 100,000 Daltons in one aspect, from about 7,000 to about 50,000 Daltons in another aspect, and from about 10,000 to about 30,000 Daltons in a further aspect. The weight average molecular weight referenced herein can be determined by gel permeation chromatography (GPC) utilizing a polystyrene standard.

Preparation of Carboxyl Group Containing Polymers

In one aspect, the crosslinked carboxyl group containing homopolymers and copolymers of the present invention are prepared by conventional free radical precipitation polymerization of a monomer mixture comprising: (a) the at least one ethylenically unsaturated carboxylic acid containing monomer or anhydride thereof; optionally (b) the at least one ethylenically unsaturated monomer different from (a) and copolymerizable therewith selected from least one alkyl ester of (meth)acrylic acid, at least one (meth)acrylamide, at least one aminoalkyl (meth)acrylate, at least one vinyl ester compound, at least one vinyl ether compound, at least one vinyl aromatic compound, and mixtures thereof; and (c) the at least one crosslinking monomer containing at least two ethylenically unsaturated groups. The monomers are first dissolved in an organic solvent (the monomers are soluble in the solvent but the corresponding polymer is not) along with the stabilizer polymer and subsequently polymerized in the presence of the stabilizing polymer utilizing a suitable free radical initiator. The stabilizing polymer can be used alone or in combination with other stabilizing polymers known in the art of dispersion or precipitation polymerization. The amount of stabilizing polymer utilized in the polymerization process of the invention ranges from about 2 parts by wt. to about 10 parts by wt. per 100 parts by wt. of total monomer in one aspect, from about 3 parts by wt. to about 8 parts by wt. in another aspect, and from about 4 parts by wt. to about 6 parts by wt. in a further aspect. When employing a combination of stabilizing polymers, the weights given above refer to the sum of the stabilizer components.

Initiators for the free radical polymerization of the carboxylic group containing monomers and optional copolymerizable monomers discussed above are the organic peroxides and hydroperoxides and/or azo compounds customary employed for this purpose. Redox initiator systems can be employed as well. The initiators can be used in amounts up to 15 wt. % in one aspect, from 0.01 to 10 wt. % in another aspect, and from 0.2 to 5 wt, % in a further aspect, based on the total weight of the monomers to be polymerized. For initiators consisting of two or more constituents (e.g., in the case of redox initiator systems), the weights given above refer to the sum of the initiator components.

Exemplary initiators are, but are not limited to, hydrogen peroxide, diacetyl peroxide, di-tert-butyl peroxide, diamyl peroxide, dioctanoyl peroxide, didecanoyl peroxide, dilauroyl peroxide, dibenzoyl peroxide, bis(o-tolyl)peroxide, succinyl peroxide, methyl ethyl ketone peroxide, di-tert-butyl hydroperoxide, acetylacetone peroxide, di(n-propyl) peroxydicarbonate, di(iso-propyl) peroxydicarbonate, di(sec-butyl) peroxydicarbonate, di-(2-ethylhexyl) peroxydicarbonate, di(cyclohexyl) peroxydicarbonate, di(cetyl) peroxydicarbonate, butyl peracetate, tert-butyl permaleinate, tert-butyl perisobutyrate, tert-butyl perpivalate, tert-butyl peroctoate, tert-butyl perneodecanoate, tert-butyl perbenzoate, tert-butyl hydroperoxide, cumene hydroperoxide, tert-butyl perneodecanoate, tert-amyl perpivalate, tert-butyl perpivalate, tert-butyl perbenzoate, tert-butyl peroxy-2-ethylhexanoate and diisopropyl peroxydicarbamate; also lithium, sodium, potassium and ammonium peroxodisulfate, 2,2'-azobisisobutyronitrile, 2,2'-azobis(2-methylbutyronitrile), 2,2'-azobis[2-methyl-N-(2-hydroxyethyl)]propionamide, 1,1'-azobis(1-cyclohexanecarbonitrile), 2,2'-azobis(2,4-dimethylvaleronitrile), 2,2'-azobis(N,N'-dimethyleneisobutyroamidine)dihydrochloride, and 2,2'-azobis(2-amidinopropane)dihydrochloride; and mixtures thereof. In one aspect, the initiator is selected from di-(2-ethylhexyl)peroxydicarbonate, dilauroyl peroxide, and mixtures thereof.

Redox initiator systems comprise at least one oxidizing, generally a peroxide compound and at least one reducing compound, for example, a reducing sulfur compound, selected from bisulfites, sulfites, thiosulfates, dithionites, tetrathionates of alkali metals or ammonium salts thereof or an organic reducing agent, such as benzoine, dimethylaniline, ascorbic acid, hydroxymethanesulfinates, and adducts of hydrogensulfite onto ketones, such as, for example, the acetone-bisulfite adduct.

The solvent used in the dispersion polymerization process include the same solvents utilized in the reaction medium for the preparation of the stabilizing polymer via the disclosed solution polymerization process. Representative hydrocarbon solvents include, but are not limited to, aromatic and substituted aromatic hydrocarbons such as benzene, ethylbenzene, toluene, xylene or the like; substituted or unsubstituted, straight or branched chain saturated aliphatic hydrocarbons of 5 or more carbon atoms, such as pentanes, hexanes, heptanes, octanes, and the like; alicyclic or substituted alicyclic hydrocarbons having 5 to 8 carbon atoms, such as cycloalkanes selected from cyclopentane, cyclohexane, cycloheptane, and cyclooctane, and the like; chlorinated hydrocarbons such as methylene chloride, chloroform, ethylene dichloride, 1,1,1-trichloroethane, trichloroethylene, perchloroethylene, and the like. Representative organic solvents include, but are not limited to, alkyl esters such as $C_1$-$C_6$ alkyl acetates and $C_1$-$C_6$ alkyl propionates selected from methyl acetate, ethyl acetate, propyl acetate, isopropyl acetate, butyl acetate, propyl propionate, butyl propionate and pentyl propionate; ketones such as acetone, methyl ethyl ketone, methyl isopropyl ketone, methyl isobutyl ketone, ethyl isopropyl ketone, 3-pentanone, cyclohexanone, and the like; and saturated alcohols containing 1 to 12 carbon atoms, such as, methanol, ethanol, propanol, isopropanol, butanol, iso-butyl alcohol, tert-butyl alcohol, 2-pentanol, and the like.

Mixtures of the hydrocarbon solvent(s) and the organic solvent(s) can be utilized in the polymerization medium. The mixed solvent system can be premixed and the mixed reaction medium can be used in the polymerization reaction. The hydrocarbon solvent(s) and the organic solvent(s) can also be added separately to the reaction mixture and the polymerization reaction can be carried out thereafter. Whether the components of the reaction medium are premixed or are added separately to a reaction mixture is immaterial as long as the polymerization reaction is carried out in the presence of at least one organic solvent and at least one hydrocarbon solvent.

In one aspect of the invention, it is desirable to utilize the same solvent system in the same amounts and ratios as employed in the preparation of the stabilizer polymer discussed previously. Given that the stabilizer polymer is added to the polymerization medium as a solution (in polymerization solvent), this ensures that the type, amount, and ratio of solvent is maintained between the solution polymerized stabilizer polymer and the polymerized carboxylic group containing homopolymers and copolymers. In one aspect, the amount of the hydrocarbon solvent, organic solvent or mixed hydrocarbon/organic solvent will normally be in excess of the monomer or monomers to be polymerized, and the proportion may vary from at least 1 wt. % monomers and 99 wt. % solvent to 50% monomers and 50% reaction medium. The amount of solvent used in the polymerization medium can range from about 50 to about 99 wt. % in one aspect, from about 60 to about 90 wt. % in another aspect, and from about 65 to about 80 wt. % in a further aspect, based on the total weight of the monomers to be polymerized and solvent.

In mixed hydrocarbon/organic solvent systems, the relative weight ratio of the at least one hydrocarbon solvent to the at least one organic solvent can be in the range of from about 95/5 to about 5/95 in one aspect, from about 80/20 to about 20/80 in another aspect, and from about 70/30 to about 30/70 in another aspect. In one aspect, the mixed hydrocarbon/organic solvent system comprises a cycloalkane and an alkyl ester (e.g., alkyl acetate, alkyl propionate). In one aspect the mixed solvent system comprises cyclohexane and ethyl acetate.

Polymerization of the carboxyl group containing monomers, optionally with the other copolymerizable monomers described previously in the reaction medium is usually carried out in a closed vessel in an inert atmosphere and under atmospheric pressure, although it can proceed under reduced or elevated pressure, or in an open vessel under reflux at atmospheric pressure under an inert gaseous blanket. The temperature of the polymerization may be varied between about 0 and about 125° C. in one aspect, from about 40 to about 100° C. in another aspect, from about 45 to about 90° C. in a further aspect, and from about 60 to about 80° C. in a still further aspect, depending on the type of initiator selected.

In the practice of the invention, the polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 45 to 90° C. at about 1 atmosphere or more. Normal polymerization time is from about 3 to 12 hours.

The linear (non-crosslinked) carboxyl group containing homopolymers and copolymers of the invention have weight average molecular weights ranging from about 10,000 to about 2,000,000 Daltons in one aspect, from about 20,000 to about 1,000,000 Daltons in another aspect, and from about 30,000 to about 800,000 Daltons in a further aspect as determined by aqueous GPC utilizing a sodium polyacrylate standard.

The crosslinked carboxyl group containing homopolymers and copolymers of the invention have weight average molecular weights ranging from about 10,000 to at least a billion Daltons in one aspect, and from about 100,000 to about 4.5 billion Daltons in another aspect, and from about 500,000 to about 3,000,000 Daltons in a further aspect, and from about 800,000 to about 1,000,000 Daltons in a still further aspect (see TDS-222, Oct. 15, 2007, Lubrizol Advanced Materials, Inc., which is herein incorporated by reference).

To obtain a polymer product with low residual monomer content, the initial polymerization step can be followed by a subsequent polymerization step. The subsequent polymerization step can take place in the presence of the same initiator system as employed in the initial polymerization or a different initiator system can be added. The subsequent polymerization step can be carried out at the same temperature as the initial polymerization or at a higher temperature. The initator(s) will be sufficiently decomposed following its use in driving additional polymerization so little or no undesirable material is present in the polymer solution product.

In one aspect of the invention and without wishing to be bound by theory, it is believed that the steric stabilizer functions to provide a steric barrier which repulses approaching polymer particles mitigating the aggregation and flocculation of polymer particles which minimizes substantial increases in reaction medium viscosity permitting efficient and easy mixing of monomer components and free radicals, effective heat transfer, reduction of polymer fouling on the reactor surfaces ultimately leading to an increase in polymer yield that can be obtained. A requirement for the steric stabilizer is that a segment of the polymer (i.e., a hydrophobe) be very soluble in the polymerization solvent (the continuous phase in a non-aqueous dispersion polymerization process) and that another segment (i.e., a hydrophile) is at least strongly adhered to the growing polymer particle.

Again, while not wishing to be held to a specific theory or mechanism, the stabilizing polymer appears to become a part of the carboxyl group containing polymer or copolymer molecule by a bonding mechanism (e.g., hydrogen bonding, Van der Walls forces) or by becoming entangled in the polymer as in an interpenetrating network or by some attractive force which seems to keep it associated with the polymer molecule. For purposes herein, we will refer to this as an interpolymer of the carboxylic acid group containing polymer or copolymer and the stabilizing polymer. The stabilizing polymer has a hydrophilic portion which is associated with the carboxylic group containing polymer or copolymer and a hydrophobic portion which extends from the polymer to provide steric stability. The polymerization reaction has unexpectedly better processing characteristics in terms of mixing efficiencies and the resultant polymer when neutralized with a base in aqueous medium has a smooth texture, good clarity, and excellent rheological characteristics.

The use of the stabilizing polymer according to the invention for the preparation of a crosslinked carboxylic group containing homopolymer or copolymer by precipitation polymerization brings with it at least one of the following advantages: 1) the reaction mixture has a lower viscosity, meaning that the heat of reaction can be better dissipated; 2) higher reaction yields (polymer solids) are possible; 3) deposit formation in the polymerization reactor can generally be successfully avoided; 4) polymer aesthetics in terms of texture and/or clarity are improved; and 5) the lower viscosity and/or the high solids contents render the process more economical.

The nascent polymer particles of the invention are dispersed throughout the reaction medium during synthesis but precipitate out of dispersion when fully converted in the polymerization medium.

The precipitated polymer can be isolated from the dispersion reaction mixture by any method known in the art for isolating polymers from a solvent such as, for example, filtration and/or centrifugation, followed by evaporation of the solvent by ambient air drying, oven drying, vacuum stripping, and the like, to obtain a dry polymer product in the form of a fine powder.

If desired, the polymer composition can be subjected to a purification step. This serves, for example, to remove residual monomer constituents and/or some of the polymerization reaction components. In one aspect, the polymer composition can be isolated after the precipitation polymerization and subjected to a washing step or successive washing steps with a solvent. Suitable solvents are in principle the same solvents employed in the polymerization medium. However, for easier drying of the polymers, it is advisable to use solvents with a low boiling point, such as, for example, acetone.

The production yield of the polymer product obtained by the method of the present invention is expressed in weight (g) of polymer product isolated from the polymerization medium divided by the sum of the combined volume (mL) of monomer(s) and the polymerization solvent (normalized to isolated polymer (g) per 100 mL total monomer plus total solvent). In one aspect, the production yield for reaction of the present invention ranges from about 12.0 g/100 mL to about 26.5 g/100 mL. The production yield is about 12.6 g/100 mL in one aspect, 17 g/100 mL, 19 g/100 mL, 19.7 g/100 mL, 25 g/100 mL, 25.4 g/100 mL, 26 g/100 mL, and 26.1 g/100 mL, in still further aspects of the invention.

The polymers and interpolymers herein are useful as rheology modifiers when neutralized in aqueous containing media at a pH ranging from about 5.0 to about 9.0. Suitable neutralizing agents include Many types of neutralizing agents can be used in the present invention, including inorganic and organic bases, and combinations thereof. Examples of inorganic bases include but are not limited to the alkali metal hydroxides (especially sodium, potassium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol, dodecylamine, cocamine, oleamine, morpholine, triamylamine, triethylamine, tetrakis(hydroxypropyl)ethylenediamine, L-arginine, aminomethyl propanol, tromethamine (2-amino 2-hydroxymethyl-1,3-propanediol), and PEG-15 cocamine.

The polymers and interpolymers of the invention are useful as formulation adjuvants to adjust the rheological properties of personal care, home care, health care, institutional and industrial care products.

This invention is illustrated by the following examples that are merely for the purpose of illustration and are not to be regarded as limiting the scope of the invention or the manner in which it can be practiced. Unless specifically indicated otherwise, parts and percentages are given by weight.

Test Methods
Viscosity

The viscosity of mucilages formulated from the polymers of the invention are measured utilizing the Brookfield rotating spindle method (all viscosity measurements reported herein are conducted by the Brookfield method whether mentioned or not). The viscosity measurements are calculated in mPa·s, employing a Brookfield rotating spindle viscometer, Model RVT (Brookfield Engineering Laboratories, Inc.), at about 20 revolutions per minute (rpm), at ambient room temperature of about 20 to 25° C. (hereafter referred to as viscosity). Spindle sizes are selected in accordance with the standard operating recommendations from the manufacturer.

A 1% (w/w) stock dispersion of resin or interpolymer of the invention is prepared in deionized (D.I.) water. The resin is introduced through a 20 mesh screen with stirring (1000 rpm) and mixed for a total of one hour. The 1% stock dispersion is used to make 400 g of polymer mucilages by diluting respective amounts of the stock solution with D.I. water to make mucilage concentrations of 0.5 wt. % and 1.0 wt. % (stock dispersion is used as is). The mucilage dispersions are neutralized to pH 7.3-7.8 with 18% NaOH and mixed at 300 rpm using an S-paddle stir blade for 3-5 min., after which the mucilages are allowed to stand at room temperature for at least 30 min. The viscosity of each sample is measured and recorded.

Clarity Testing

The clarity of a 0.5 wt. % polymer mucilage neutralized to pH 7.3 to 7.8 with 18% NaOH is measured in % T (transmittance) by Brinkmann PC 920 calorimeter at least about 24 hours after the composition is made. Clarity measurements are taken against deionized water (clarity rating of 100%) at with a 420 nm wavelength.

Salt Sensitivity

Salt sensitivity on 1.0% mucilages are evaluated at 1.0% salt concentrations (w/w) in the following manner: Using the 1% mucilage concentration of resin or interpolymer of the invention, NaCl is added in solid form with stirring using an S-paddle at 300 rpm for 3-5 minutes. The results are reported as NaCl viscosity.

Molecular Weight

The weight average molecular weight of the stabilizer polymers of the invention can be determined by the following methodology.

Mobile Phase: Add 20 mL of stabilized HPLC grade tetrahydrofuran (THF) to 0.05-0.06 grams of stabilizer polymer sample. Gently shake the mixture for 1-2 hours to dissolve. Filter through a 0.45 µm PTFE disposable filter and inject into the GPC port.

The chromatographic instrumentation and conditions are as follows:

Instrument: Waters Corporation Model 515 Pump, Alcott Model 708 autosampler
Detector: Waters Corporation Model 2410 Refractive Index @ 40° C.
Column Set: Agilent Technologies PLgel Guard+2× Mixed-C (5 µm), 300×7.5 mm
Mobile Phase: THF, stabilized with 250 ppm BHT, 1.0 mL/min, @ 50° C.
Injection Volume: 100 µl (concentration ~0.25%)
Data Acquisition: Waters Corporation Empower Pro Software The molecular weight calibration curve is established with EasiCal polystyrene standards (Agilent Technologies). A monomer with MW=162 Daltons was added to one standard. The calibration curve covered a molecular weight range from 162 to $7.50 \times 10^6$.

The weight average molecular weight of the linear carboxyl group containing polymers prepared in the presence of the stabilizer polymers of the invention can be determined by aqueous GPC as follows.

Mobile Phase: Prepare a 0.05% solution of sample polymer in 0.3M sodium acetate in 10% aqueous HPLC grade acetonitrile adjust carrier to pH 10 with NaOH. Gently shake the mixture for 1-2 hours to dissolve. Filter through a 0.22 µm syringe filter into the autosampler vial.

The chromatographic instrumentation and conditions are as follows:

Instrument: Waters Corporation Model 590 Pump, Micromeritics Model 725 autosampler
Detector: Erma ERC 3320 Refractive Index @ 40° C.
Column Set: Tosoh Bioscience (1) $TSK_{gel}$ G6000PW (30× 7.5 mm) (12 µm)+(2) $TSK_{gel}$ G3006PW (30×7.5 mm) (12 µm)
Mobile Phase: 0.3M sodium acetate in 10% aqueous HPLC grade acetonitrile adjusted to pH 10 with NaOH., 0.8 mL/min. @ 50° C.
Injection Volume: 100 µl (concentration ~0.05%)
Data Acquisition: Waters Corporation Empower Pro Software The molecular weight calibration curve is established with a sodium polyacrylate standard with a weight average molecular weight ranging from 1,000 to 1,000,000 Daltons.

The molecular weight of the crosslinked carboxyl containing polymers of the invention is discussed in Technical Data Sheet TDS-222, dated Oct. 15, 2007, which is herein incorporated by reference.

The following abbreviations and trade names are utilized in the examples.

| ABBREVIATIONS | |
|---|---|
| AA | Acrylic Acid |
| APE | Allyl Pentaerythritol |
| AMA | Allyl Methacrylate |
| Alpernox-F™ | Dilauroyl Peroxide (Elf Atochem North America) |
| AS | Allyl Sucrose |
| n-BA | n-Butyl Acrylate |
| CycloH | Cyclohexane |
| EtAc | Ethyl Acetate |
| GMA | $C_{12}$-$C_{32}$ Guerbet Methacrylate |
| Lupersol™ 223 | Di(2-ethylhexyl)peroxydicarbonate (Elf Atochem North America) |
| HEMA | Hydroxyethyl Methacrylate |
| LMA | Lauryl Methacrylate |
| MeCl | Methylene Chloride |
| MAm(PEG) | mPEG Ester of Methacrylic Acid (reaction product of methoxy poly(ethylene glycol) 350 Daltons ($M_w$) with Methacrylic acid) |
| MMA | Methyl Methacrylate |
| NVP | N-Vinyl Pyrrolidone (V-Pyrol® RC, Ashland Chemical) |
| SMA | Stearyl Methacrylate (Sigma-Aldrich, 411442-Technical Grade) |
| TMPDAE | Trimethylolpropane Diallylether |
| VA | Vinyl Acetate |
| VND | Vinyl Neodecanoate |

Example 1

This example illustrates a typical synthesis procedure for preparing the stabilizer polymer of the invention.

Into a one liter closed 4-necked water-jacketed Pyrex® glass resin kettle reactor equipped with a propylene glycol-cooled condenser, a temperature controlled water bath reservoir and circulation pump, a nitrogen sparge tube and a stainless steel stirring shaft fitted with a lower mixing blade situated 1 in. above the reactor bottom and an upper mixing blade situated 2 in. above the reactor bottom is placed the recipe amounts of SMA, NVP and n-BA monomers indicated in Table 1. The recipe amount of cyclohexane solvent is subsequently added to the monomers and nitrogen gas is then sparged through the solution with stirring at 250 rpm. The nitrogen sparge is continued for 55 min. during which time the reactor contents are heated to 60° C. by circulating water from the pre-heated water bath through the water-jacketed reactor. The recipe amount of initiator no. 1 is added to the reactor via a syringe. 10 min. after the initiator injection the sparge tube is raised out of the reaction medium and into the head space of the closed reactor to maintain an inert gaseous blanket over the reaction medium. The polymerization reaction is continued for 2 hours at 60° C. followed by metering the recipe amount of initiator no. 2 into the reaction medium over the next 2 hrs. and raising the bath temperature to 75° C. When the reaction temperature reaches 75° C., the polymerization is continued at 75° C. for 4 additional hrs. to eliminate any residual monomer that may be present in the medium. The reaction is stopped and the polymer solution is cooled to ambient temperature removed from the reactor and stored in a glass container.

TABLE 1

| Component | Parts (wt.) | Weight (g) |
|---|---|---|
| Monomer | | |
| SMA | 30 | 81 |
| NVP | 50 | 135 |
| n-BA | 20 | 54 |
| Solvent | | |
| Cyclohexane | 231 | 556 |
| Initiator No. 1 | | |
| Lupersol™ 223 Solution (10% active) | 1.0 | 27 |
| Initiator No. 2 | | |
| Alperox-F™ Solution (10% active) | 1.0 | 27 |
| Total | 333 | 880 |
| Total Polymer Solids (wt. %) | | 30 |

Example 2

This example illustrates a typical synthesis procedure for preparing a crosslinked homopolymer of acrylic acid in accordance with the present invention.

The polymer is prepared in a one liter closed 4-necked water-jacketed Pyrex® glass resin kettle reactor equipped with a propylene glycol-cooled condenser, a temperature controlled water bath reservoir and circulation pump, a nitrogen sparge tube and a Caframo® overhead stirrer (Model No. BDC1850) outfitted with a stainless steel stirring shaft configured with a lower H-shaped mixing blade situated 1 in. above the reactor bottom and an upper propeller mixer situated 2 in. above the reactor bottom. The stirring shaft configuration is described in more detail below. Into the reactor is placed the recipe amounts of AA, crosslinker monomer and steric stabilizer polymer solution set forth in Table 2. The recipe amount of the solvent system (cyclohexane and ethyl acetate) is subsequently added to the reactor followed by sparging nitrogen gas through the medium with stirring at 250 rpm. The nitrogen sparge is continued for 30 min. during which time the reactor contents are heated to 45° C. by circulating water from the pre-heated water bath through the water-jacketed reactor. The recipe amount of initiator no. 1 is added to the reactor via a syringe after which the sparge tube is raised out of the reaction medium and into the head space of the closed reactor to maintain an inert gaseous blanket over the reaction medium. The polymerization reaction is continued at 45° C. for 6 hrs. during which the speed of the stirrer is adjusted to maintain effective mixing, followed by addition of the recipe amount of initiator no. 2 (in cyclohexane/ethyl acetate-solvent system 2). The polymerization is completed after any residual monomer that may be present in the medium is eliminated. After the polymer dispersion is cooled to ambient temperature and removed from the reactor, the solvent is stripped under vacuum at about 100° C. resulting fine but free-flowing dry powders as the final product. The production yield of the reaction is 19.7 g/100 mL.

TABLE 2

| Component | Weight (g) |
|---|---|
| AA | 207 |
| APE | 1.18 |
| TMPDAE | 0.17 |
| Stabilizer Polymer of Ex. 1 (30% Active) | 34.5 |
| Solvent System 1 | |
| Cyclohexane | 462.17 |
| Ethyl Acetate | 198.07 |
| Solvent System 2 | |
| Cyclohexane | 35 |
| Ethyl Acetate | 15 |
| Lupersol™ 223 first initiator (10% active) | 1.04 |
| Lupersol™ 223 second initiator (10% active) | 2.07 |

Figure 2:
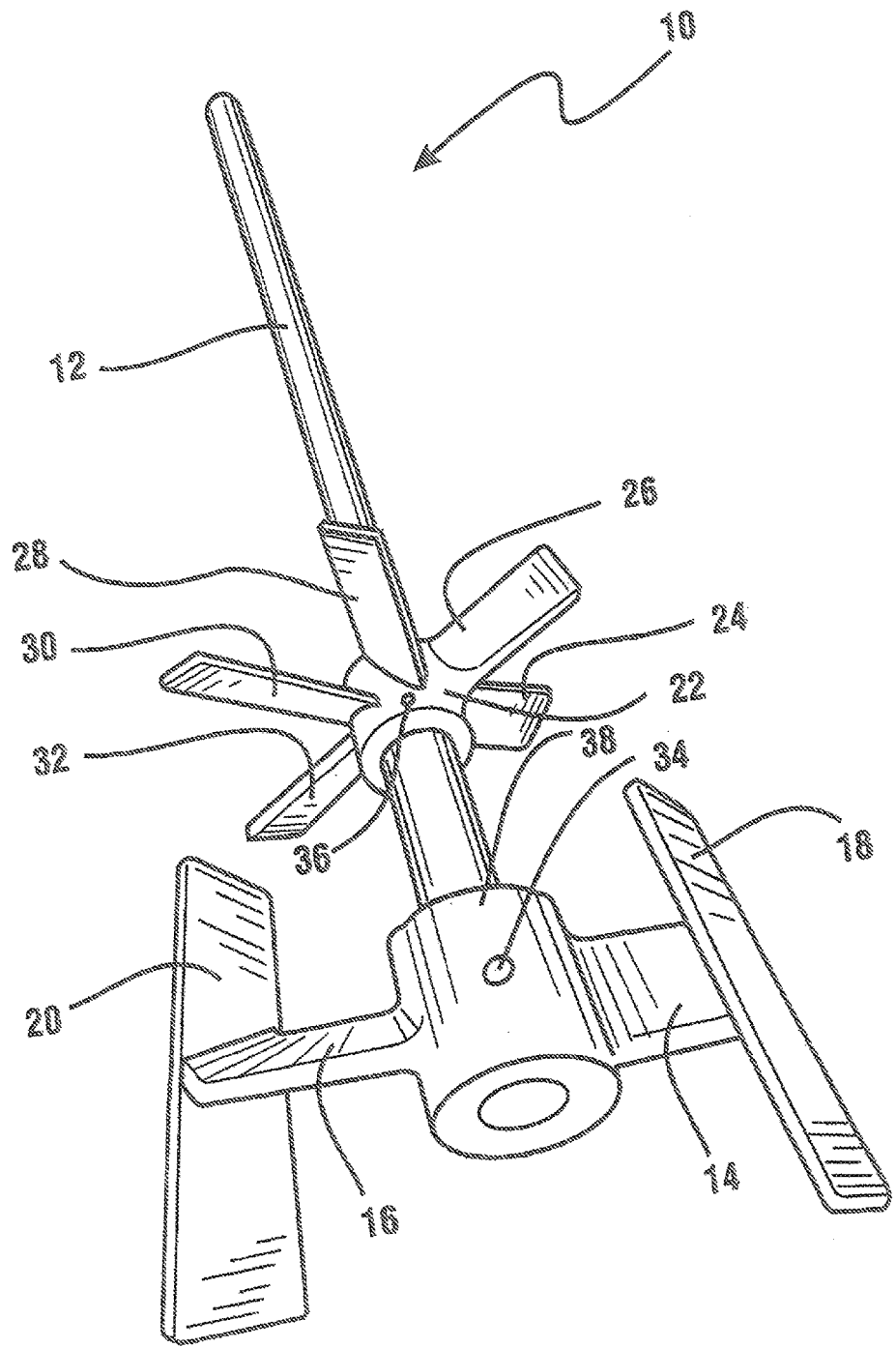
FIG. 2 is a drawing illustrating a stirrer utilized to obtain the mixing efficiency data from the stirred reaction media during the precipitation polymerization reactions employing the steric stabilizers of the invention.

An exemplary embodiment of a stirrer 10 used to stir the reaction media during the preparation of the novel polymers of this invention is shown in FIG. 2. In the exemplary embodiment shown, the stirrer 10 has a vertical center shaft 12. The stirrer 10 has two mixing members, an H shaped mixing member located near the bottom of the stirrer 10 and an upper propeller mixing member located above the H shaped mixing member. The H shaped member consists of two horizontal blade elements 14 and 16. The two horizontal blade elements 14 and 16 are situated in the same horizontal plane and are spaced 180° apart. The H shaped member has a hub 38 which is attached to center shaft 12 by use of set screw 34. Hub 38 has an opening extending vertically through the center of hub 38 and configured to receive vertical center shaft 12. Each of the horizontal blade elements 14 and 16 is attached to hub 38 and is pitched at opposing 45° angles relative to the horizontal plane that is perpendicular to the vertical axis of the vertical center shaft 12. The H shaped mixing member also has two vertical legs 18 and 20. Vertical legs 18 and 20 are of equal dimensions. Vertical leg 18 is attached at its midpoint to the distal end of horizontal blade element 14 and vertical leg 20 is attached at its midpoint to the distal end of horizontal blade element 16. Each vertical leg 18 and 20 is parallel to the vertical axis of center shaft 12 and is pitched at a 45° angle in the vertical plane that is perpendicular to the horizontal plane of horizontal blade elements 14 and 16. Stirrer 10 also has a second mixing member, which is a propeller mixing member. The propeller mixing member has a hub 22 with a vertical opening located in the center of hub 22 to receive the vertical center shaft 12 and has six propeller blades, five of which are indicated at 24, 26, 28, 30, and 32. The sixth propeller blade is not shown in FIG. 2, as it is hidden by the hub 22. Hub 22 is attached to center shaft 12 by set screw 36. The six propeller blades are of equal dimension and are perpendicularly located and evenly spaced around the circumference of the vertical center shaft 12. The hub 22 and the six propeller blades are integral with each other, being machined or cast from a single piece of metal. Each of the six propeller blades is pitched at 45° relative to the horizontal plane that is perpendicular to the vertical axis of the vertical center shaft 12. In one aspect, the material of construction for stirrer 10 is stainless steel. The H shaped mixing member is located at the bottom of the stirrer 10 and when rotated clockwise tends to move the reactants and polymers formed during the reaction toward the wall of the reaction vessel. The propeller mixing member is located above the H shaped mixing member and tends to create a pumping action to the reaction medium. If the stirrer 10 were rotated counterclockwise, it would tend to move the reaction materials away from the reactor vessel walls. The one embodiment of stirrer 10 shown in FIG. 2 is but one example and those skilled in the art could envision other embodiments having greater numbers of vertical legs and more or less propeller blades and pitched at different angles to achieve a particular mixing result.

The efficacy of the steric stabilizer on the reaction is rated by the mixing efficiency of the stirred reaction during the precipitation polymerization run. Efficient steric stabilizers effectively lower the polymer slurry viscosity and enables high polymer solids (polymer production yield) to be practically made without the deleterious problems associated with poor heat transfer resulting in polymers with inferior properties due to poor mixing of the reactants. The maximum mixing speed (RPM) of the stirring shaft as well as the maximum torque (in.-oz.) needed to maintain good stirring efficiency as observed by no stagnant flow in the reaction medium (polymer slurry) are recorded from the digital display of the Caframo® stirrer for each polymerization run. The rating scale is set forth in Table 3.

TABLE 3

| Process Rating | Maximum Stirrer Rotation (RPM) | Maximum Torque (in.-oz.) |
|---|---|---|
| Excellent | 0-500 | 0-10 |
| Good | >500-800 | >10-15 |
| Fair+ | >800-1000 | >15-25 |
| Fair | >600-1000 | >18-25 |
| Poor | >800-1000 | >25-35 |
| Bad | >800 | >35-60 |

The process rating for the polymerization run of this example is rated as excellent.

Examples 3 to 22

Stabilizer polymers of the invention are prepared from the recipe amounts of components set forth in Table 4 via the process illustrated in Example 1.

TABLE 4

| Ex. No. | NVP (wt. %) | Long Chain Hydrophobe (wt. %) | Short Chain Hydrophobe (wt. %) | NVP (mol. %) | Long Chain Hydrophobe/NVP (mol. ratio) |
|---|---|---|---|---|---|
| 3 | 60 | — | n-BA (40) | (63.37) | — |
| 4 | 60 | SMA (40) | — | (82.05) | (0.22) |
| 5 | 60 | SMA (30) | n-BA (10) | (76.41) | (0.16) |
| 6 | 28 | SMA (34) | n-BA (38) | (38.83) | (0.40) |
| 7 | 28 | SMA (38) | n-BA (34) | (40.03) | (0.45) |
| 8 | 40 | SMA (35) | n-BA (25) | (54.67) | (0.29) |
| 9 | 40 | SMA (36) | n-BA (24) | (55.08) | (0.30) |
| 10 | 43 | SMA (34) | n-BA (23) | (58.03) | (0.26) |
| 11 | 45 | SMA (32) | n-BA (23) | (59.64) | (0.23) |
| 12 | 50 | SMA (20) | n-BA (30) | (60.55) | (0.13) |
| 13 | 40 | GMA (35) | n-BA (25) | (54.67) | (0.29) |
| 14 | 50 | SMA (30) | n-BA (20) | (64.78) | (0.20) |
| 15 | 45 | SMA (35) | n-BA (20) | (60.95) | (0.26) |
| 16 | 55 | SMA (25) | n-BA (20) | (68.28) | (0.15) |
| 17 | 60 | SMA (20) | n-BA (20) | (71.51) | (0.11) |

Examples 18 to 28

Comparative stabilizer polymers utilizing various hydrophilic and hydrophobic monomers in addition to NVP and short and long chain alkyl esters of (meth)acrylic acid are prepared from the recipe amounts of the monomer components set forth in Table 5 via the process illustrated in Example 1. The process rating for selected runs is set forth in Table 9.

TABLE 5

| Ex. No (Comparative). | NVP (wt. %) | AA (wt. %) | MAm (PEG) | HEMA | Long Chain Hydrophobe (wt. %) | Short Chain Hydrophobe (wt. %) | NVP (mol. %) | Long Chain Hydrophobe/NVP (mol. ratio) |
|---|---|---|---|---|---|---|---|---|
| 18 | (80) | — | — | — | SMA (10) | n-BA (10) | (87) | (0.04) |
| 19 | (90) | — | — | — | SMA (5) | n-BA (5) | (93.77) | (0.02) |
| 20 | (30) | (1) | — | — | SMA (4) VND (45) | VA (20) | (35.73) | (0.04) |
| 21 | (20) | (1) | — | — | SMA (4) VND (40) | VA (35) | (22.09) | (0.07) |
| 22 | (60) | (1) | — | — | SMA (30) | n-BA (9) | (75.76) | (0.16) |
| 23 | (60) | (1) | — | — | SMA (30) | MMA (9) | (72.27) | (0.16) |
| 24 | (40) | (10) | — | — | SMA (30) | n-BA (20) | (48.41) | (0.25) |
| 25 | (30) | — | — | — | SMA (30) | MMA (40) | (32.77) | (0.33) |
| 26 | (20) | — | (5) | — | SMA (40) | MMA (35) | (25.02) | (0.66) |
| 27 | — | — | — | (50) | SMA (30) | n-BA (20) | — | — |

TABLE 5-continued

| Ex. No (Comparative). | NVP (wt. %) | AA (wt. %) | MAm (PEG) | HEMA | Long Chain Hydrophobe (wt. %) | Short Chain Hydrophobe (wt. %) | NVP (mol. %) | Long Chain Hydrophobe/NVP (mol. ratio) |
|---|---|---|---|---|---|---|---|---|
| 28 | — | — | — | (50) | SMA (30) | MMA (20) | — | — |

Examples 29 to 34

The following examples illustrate the synthesis of cross-linked carboxyl group containing copolymers in the presence of the stabilizer polymer of Example 1. The polymers are prepared from the recipe amounts of the components set forth in Table 6 in accordance with polymerization procedure of Example 2.

TABLE 6

| Ex. No. | AA (parts) | SMA (parts) | LMA (parts) | Crosslinker (parts) | | Stabilizer Polymer (parts) | Solvent CycloH/EtAc (wt. ratio) | Process Rating | Production Yield (g/100 mL) |
|---|---|---|---|---|---|---|---|---|---|
| 29 | 100 | (3) | — | APE | (0.4) | (5) | (46/54) | Good | (25.0) |
| 30 | 100 | (3) | — | APE | (0.55) | (5) | (70/30) | Excellent | (25.4) |
| 31 | 100 | (5) | — | APE | (0.55) | (5) | (70/30) | Excellent | (25.3) |
| 32 | 100 | — | (5) | TMPDAE | (0.1) | (5) | (70/30) | Excellent | (25.4) |
| 33 | 100 | — | (5) | TMPDAE (0.25) | AMA (0.05) | (5) | (70/30) | Excellent | (25.3) |
| 34 | 100 | — | (10) | TMPDAE (0.25) | AMA (0.05) | (5) | (70/30) | Excellent | (25.3) |

Example 35

Mucilages are prepared from the acrylic acid copolymers of Examples 29-34 and evaluated for clarity and Brookfield viscosity. The results are set forth in Table 7.

TABLE 7

| Polymer of Ex. No. | % T | 0.5% Mucilage Viscosity (mPa · s) | 1% Mucilage NaCl Viscosity (mPa · s) |
|---|---|---|---|
| 29 | 97.6% | 15,250 | 8,120 |
| 30 | 96.3% | 24,800 | 8,920 |
| 31 | 96.0% | 20,500 | 6,300 |
| 32 | 98.0% | 810 | 2,420 |
| 33 | 98.1% | 3,780 | 6,880 |
| 34 | 97.9% | 9,020 | 16,440 |

Examples 36 to 39

Crosslinked acrylic acid homopolymers are prepared by the process of Example 2 in the presence of the stabilizer polymers of Examples 3 and 4 using the recipe amounts of the components set forth in Table 8. The production yields and process ratings for each run are also set forth in the table. The production yield for a polymerization run without a stabilizer polymer is 9.5 g/100 mL.

TABLE 8

| Ex. No. | Stabilizer Polymer Ex. No. (parts) | AA (parts) | APE (parts) | Solvent CycloH/EtAc (ratio) | Production Yield (g/100 mL) | Max. (rpm) | Max. Torque (in.-oz.) | Process Rating |
|---|---|---|---|---|---|---|---|---|
| 36 | Ex. 3 (5) | (100) | (0.6) | (70/30) | (12.6) | 600 | 13 | Fair+ |
| 37 | Ex. 4 (5) | (100) | (0.6) | (70/30) | (12.6) | 300 | 18 | Good |
| 38 | Ex. 4 (5) | (100) | (0.6) | (70/30) | (17.0) | 600 | 21 | Fair |
| 39 | Ex. 4 (5) | (100) | (0.6) | (70/30) | (19.7) | 650 | 18 | Fair |

Examples 40 to 47 (Comparative)

Crosslinked homopolymers of acrylic acid are prepared from the comparative stabilizers synthesized in Examples 18-23, 25 and 26. The homopolymerization procedure of Example 2 is followed utilizing the recipe amounts of components set forth in Table 9.

TABLE 9

| Ex. No. | Stabilizer Polymer Ex. No. (parts) | AA (parts) | APE (parts) | AS (parts) | Solvent CycloH/EtAc (ratio) | Production Yield (g/100 ml) | Max. (rpmL) | Max. Torque (in.-oz.) | Process Rating |
|---|---|---|---|---|---|---|---|---|---|
| 40 | Ex. 18 (5) | (100) | (0.7) | 0.050 | (70/30) | (17.0) | 1000 | 24 | Poor |
| 41 | Ex. 19 (5) | (100) | (0.7) | 0.050 | (70/30) | (17.0) | 1300 | 35 | Poor |
| 42 | Ex. 20 (5) | (100) | (0.7) | (0.05) | (70/30) | (19.7) | 1000 | 45 | Poor |
| 43 | Ex. 21 (5) | (100) | (0.7) | (0.05) | (70/30) | (19.7) | 1000 | 34 | Poor |
| 44 | Ex. 22 (5) | (100) | (0.7) | (0.05) | (70/30) | (21.5) | 1200 | 38 | Bad |
| 45 | Ex. 23 (5) | (100) | (0.7) | (0.05) | (70/30) | (21.5) | 1400 | 37 | Bad |
| 46 | Ex. 25 (5) | (100) | (0.68) | (0.06) | (70/30) | (21.5) | 650 | 10 | Poor |
| 47 | Ex. 26 (5) | (100) | (0.7) | (0.05) | (70/30) | (17.0) | 1000 | 45 | Poor |

Example 49

Mucilages are prepared from the comparative acrylic acid homopolymers of Examples 40, 41 and 44-47 and evaluated for clarity and Brookfield viscosity properties. The results are set forth in Table 10.

TABLE 10

| Polymer of Ex. No. | % T | 0.5% Mucilage Viscosity (mPa · s) | 1% Mucilage NaCl Viscosity (mPa · s) |
|---|---|---|---|
| 40 | 96.2 | 42,400 | 7,640 |
| 41 | 95.7 | 43,000 | 6,080 |
| 44 | 94.4 | 53,400 | 6,270 |
| 45 | 91.8 | 50,800 | 6,880 |
| 46 | 88.1 | 51,600 | 4,380 |
| 47 | 95.8 | 52,200 | 5,260 |

Examples 50 to 66

Crosslinked acrylic acid homopolymers are prepared by the process of Example 2 in the presence of the stabilizer polymers of Examples 1, 5 and 6-17 using the recipe amounts of the components set forth in Table 11. The production yields and polymerization process ratings for each run are also set forth in the table.

TABLE 11

| Ex. No. | AA (parts) | APE (parts) | AS (parts) | TMPDAE (parts) | Stabilizer Polymer (parts) | Solvent CycloH/EtAc (wt. ratio) | Prodution Yield (g/100 mL) | Max. (rpm) | Max. Torque (in.-oz.) | Process Rating |
|---|---|---|---|---|---|---|---|---|---|---|
| 50 | (100) | (0.60) | (0.10) | — | Ex. 5 (5) | (70/30) | (19.0) | 850 | 22 | Fair+ |
| 51 | (100) | (0.70) | — | — | Ex. 6 (5) | (70/30) | (19.7) | 300 | 4 | Excellent |
| 52 | (100) | (0.70) | — | — | Ex. 7 (5) | (70/30) | (19.7) | 350 | 5 | Excellent |
| 53 | (100) | (0.70) | — | — | Ex. 8 (5) | (70/30) | (19.7) | 500 | 8 | Excellent |
| 54 | (100) | (0.65) | (0.05) | — | Ex. 9 (5) | (70/30) | (19.7) | 500 | 10 | Excellent |
| 55 | (100) | (0.70) | — | — | Ex. 10 (5) | (70/30) | (19.7) | 500 | 11 | Good |
| 56 | (100) | (0.75) | (0.05) | — | Ex. 11 (5) | (70/30) | (19.7) | 400 | 7 | Excellent |
| 57 | (100) | (0.75) | (0.05) | — | Ex. 12 (5) | (70/30) | (19.0) | 400 | 9 | Excellent |
| 58 | (100) | (0.70) | (0.05) | — | Ex. 13 (5) | (70/30) | (19.7) | 400 | 5 | Excellent |
| 59 | (100) | (0.70) | — | (0.10) | Ex. 14 (5) | (70/30) | (19.7) | 500 | 12 | good |

TABLE 11-continued

| Ex. No. | AA (parts) | APE (parts) | AS (parts) | TMPDAE (parts) | Stabilizer Polymer (parts) | Solvent CycloH/EtAc (wt. ratio) | Prodution Yield (g/100 mL) | Max. (rpm) | Max. Torque (in.-oz.) | Process Rating |
|---|---|---|---|---|---|---|---|---|---|---|
| 60 | (100) | (0.70) | — | (0.10) | Ex. 15 (5) | (70/30) | (19.7) | 500 | 15 | Good |
| 61 | (100) | (0.75) | (0.05) | — | Ex. 16 (5) | (70/30) | (19.7) | 400 | 11 | Good |
| 62 | (100) | (0.70) | (0.05) | — | Ex. 17 (5) | (70/30) | (21.5) | 900 | 18 | Fair |
| 63 | (100) | (0.60) | — | — | Ex. 1 (5) | (46/54) | (19.8) | 400 | 11 | Good |
| 64 | (100) | (0.60) | — | — | Ex. 1 (5) | (58/42) | (19.5) | 500 | 9 | Good |
| 65 | (100) | (0.60) | — | — | Ex. 1 (5) | (34/66) | (20.1) | 500 | 11 | Good |

Example 66

Mucilages are prepared from the comparative acrylic acid homopolymers of Examples 50-65 and evaluated for clarity and Brookfield viscosity properties. The results are set forth in Table 12.

Examples 67 to 69

Crosslinked acrylic acid homopolymers are prepared by the process set forth in Examples 50-65 in the presence of the stabilizer polymers of Examples 11 and 14 using the recipe amounts of the components set forth in Table 13. A single component polymerization solvent system is employed instead of the mixed solvent system employed in Examples 50-65. The production yields and polymerization process ratings for each run are also set forth in the table.

TABLE 13

| Ex. No. | AA (parts) | APE (parts) | AS (parts) | Stabilizer Polymer (parts) | Solvent (wt. ratio) | Max. (rpm) | Max. Torque (in.-oz.) | Prodution Yield (g/100 mL) | Process Rating |
|---|---|---|---|---|---|---|---|---|---|
| 67 | (100) | (0.60) | — | Ex. 11 (5) | CycloH (100) | 700 | 12 | (18.6) | Fair |
| 68 | (100) | (0.60) | — | Ex. 11 (5) | EtAc (100) (1.5 phm $K_2CO_3$)[1] | 400 | 25 | (18.6) | Fair+ |
| 69 | (100) | (0.60) | (0.05) | Ex. 14 (5) | MeCl (100) | 250 | 5 | (17.9) | Excellent |

[1]Neutralizing agent

TABLE 12

| Polymer of Ex. No. | % T | 0.5% Mucilage Viscosity (mPa · s) | 1% Mucilage NaCl Viscosity (mPa · s) |
|---|---|---|---|
| 50 | 94.8 | 41,200 | — |
| 51 | 94.6 | 49,600 | 4,100 |
| 52 | 94.8 | 49,400 | 3,720 |
| 53 | 94.7 | 53,400 | 5,040 |
| 54 | 92.9 | 58,400 | 3,660 |
| 55 | 97.1 | 49,400 | 5,260 |
| 56 | 94.3 | 52,400 | 5,700 |
| 57 | 93.6 | 50,400 | 6,200 |
| 58 | 94.2 | 43,400 | 5,440 |
| 59 | 94.8 | 47,800 | 6,920 |
| 60 | 94.1 | 48,600 | 5,560 |
| 61 | 93.2 | 48,400 | 5,900 |
| 62 | 96.4 | 45,800 | 7,540 |
| 63 | 95.3 | 27,000 | 6,080 |
| 64 | 97.1 | 24,600 | 7,040 |
| 65 | 94.6 | 37,000 | 4,600 |

Example 70

Film characteristics of thin film of a mucilage made from a carboxyl group containing polymer that is prepared in the presence of the stabilizer polymer of the invention is compared with a similar carboxyl group containing polymer that is prepared in the presence of a stabilizer polymer disclosed in U.S. Pat. No. 5,288,814. Mucilages are made from the polymer of Example 2 (Sample A) and a similarly made comparative polymer except that the comparative polymer is prepared in the presence of a linear block copolymer of a polyhydroxy fatty acid hydrophobic block portion and a polyethylene glycol hydrophilic block portion (Hypermer™ B246 available from Unichema).

A polymer mucilage (0.5 wt. %) neutralized to pH 7.3 to 7.8 is prepared for each test polymer and placed in a 50 mL centrifuge tube and centrifuged for 15 min. at 2000 rpm. The samples are tested within 2 hrs. of neutralization to avoid inherent changes in mucilages due to swelling. 5 g of each sample is placed at the top of a clear glass plate (12 in.×12 in.×0.25 in) and drawn with a Bird Film Applicator® (film width 3.5 inches, film thickness 0.010 inch) to the bottom of the glass at a controlled uniform rate to form a thin film. The films are visually evaluated after the film is drawn and checked at several angles for film surface textural imperfections.

As shown in FIG. 1, the film (Sample A) made with the polymer of Example 2 is relatively clear, smooth and devoid of textural defects. The comparative film (Sample B) made with the comparative polymer exhibits very poor film properties. The film is very gritty and/or grainy.

The invention claimed is:

1. A polymer composition comprising a carboxyl group containing polymer and at least one stabilizer polymer, wherein said polymer composition is prepared by polymerizing a free-radically polymerizable monomer composition in a non-aqueous medium comprising: (a) at least one ethylenically unsaturated carboxylic acid containing monomer or anhydride thereof; (b) optionally at least one ethylenically unsaturated monomer different from (a) but copolymerizable therewith; and optionally (c) at least one crosslinking monomer containing at least two ethylenically unsaturated groups; in the presence of said at least one stabilizer polymer, wherein said at least one stabilizer polymer comprises repeating units prepared by polymerizing a stabilizer monomer composition comprising N-vinyl pyrrolidone, at least one short chain alkyl ester of (meth)acrylic acid selected from a $C_1$-$C_5$ alkyl (meth)acrylate and at least one long chain alkyl ester of (meth)acrylic acid selected from a $C_{10}$-$C_{22}$ alkyl (meth)acrylate, wherein the amount of said N-vinyl pyrrolidone in said at least one stabilizer polymer ranges from about 32 to about 82 mol. % and said at least one short chain alkyl ester of (meth)acrylic acid and at least one long chain alkyl ester of (meth)acrylic acid ranges from about 68 to about 18 mol. %.

2. A polymer composition of claim 1, wherein said at least one stabilizer polymer is prepared from N-vinyl pyrrolidone, said at least one short chain alkyl ester of (meth)acrylic acid selected from ethyl (meth)acrylate and butyl (meth)acrylate, and said at least one long chain alkyl ester of (meth)acrylic acid selected from decyl (meth)acrylate, isodecyl (meth) acrylate, lauryl (meth)acrylate, myristyl (meth)acrylate, stearyl (meth)acrylate, and behenyl (meth)acrylate.

3. A polymer composition of claim 2, wherein said at least one stabilizer polymer is prepared from a monomer composition comprising N-vinyl pyrrolidone, butyl acrylate and stearyl methacrylate.

4. A polymer composition of claim 1, wherein said free-radically polymerizable monomer composition comprises: (a) said at least one vinyl carboxylic acid group containing monomer selected from acrylic acid, methacrylic acid, itaconic acid, citraconic acid, maleic acid, fumaric acid, crotonic acid, aconitic acid, $C_1$-$C_{18}$ alkyl monoesters of maleic, fumaric, itaconic, and aconitic acid, methyl hydrogen maleate, monoisopropyl maleate, butyl hydrogen fumarate, anhydrides of dicarboxylic acids selected from maleic anhydride, itaconic anhydride, and citraconic anhydride; optionally, (b) said at least one ethylenically unsaturated monomer different from (a) and copolymerizable therewith selected from at least one alkyl ester of (meth)acrylic acid, at least one (meth)acrylamide, at least one aminoalkyl (meth)acrylate, at least one vinyl ester compound, at least one vinyl lactam compound, at least one vinyl aromatic compound, and mixtures thereof.

5. A polymer composition of claim 4, wherein said alkyl ester of (meth)acrylic acid component in said free-radically polymerizable monomer composition is represented by formula III:

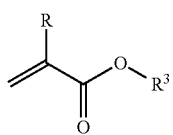

wherein R is selected from hydrogen, methyl, ethyl, halo, cyano, cyclohexyl, phenyl, benzyl, tolyl, and xylyl; $R^3$ is selected from linear and branched alkyl having from 1 to 30 carbon atoms.

6. A polymer composition of claim 5, wherein said alkyl ester of (meth)acrylic acid is selected from methyl (meth)acrylate, ethyl (meth)acrylate, propyl (meth)acrylate, isopropyl (meth)acrylate, butyl (meth)acrylate, isobutyl (meth) acrylate, 2-methylbutyl (meth)acrylate, hexyl (meth) acrylate, heptyl (meth)acrylate, 2-ethylhexyl (meth)acrylate, octyl (meth)acrylate, and isooctyl (meth)acrylate, nonyl acrylate, decyl (meth)acrylate, isodecyl (meth)acrylate, lauryl (meth)acrylate, myristyl (meth)acrylate, stearyl (meth) acrylate, behenyl (meth)acrylate and melissyl (meth)acrylate, and mixtures thereof.

7. A polymer composition of claim 4, wherein said at least one (meth)acrylamide component in said free-radically polymerizable monomer composition is represented by formulas IV and IVA:

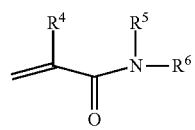

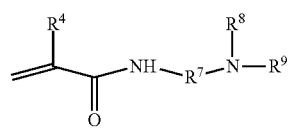

wherein $R^4$ is selected from hydrogen and methyl; and $R^5$, $R^6$, independently, are selected from hydrogen and $C_1$-$C_5$ alkyl; $R^5$, $R^6$ taken together with the nitrogen atom to which they are attached form a heterocyclic ring containing 3 to 5 carbon atoms and, optionally a heteroatom selected from N, O, and S, $R^7$ is $C_1$ to $C_5$ alkylene, and $R^8$, $R^9$, independently, are selected from hydrogen and $C_1$-$C_5$ alkyl.

8. A polymer composition of claim 7, wherein said at least one (meth)acrylamide component is selected from N-methyl (meth)acrylamide, N-ethyl(meth)acryl amide, N-propyl (meth)acrylamide, N-(butyl)(meth)acrylamide, N-tert-butyl (meth)acrylamide, n-pentyl(meth)acrylamide, n-hexyl (meth)acrylamide, n-heptyl(meth)acrylamide, N,N-dimethyl(meth)acrylamide, N,N-diethyl(meth)acrylamide, piperidinyl(meth)acrylamide, morpholinyl(meth)acrylamide, N—($C_1$-$C_5$)alkylamino($C_1$-$C_5$)alkyl(meth)acrylamides are selected from, but are not limited to, N-methylamino methyl (meth)acrylamide, N-methylamino ethyl (meth)acrylamide, N-ethylamino methyl (meth)acrylamide, N-ethylamino ethyl (meth)acrylamide, N-propylamino methyl (meth)acrylamide, N-propylamino ethyl (meth)acrylamide, N-butylamino methyl (meth)acrylamide, N-butylamino ethyl (meth)acrylamide, N-pentylamino methyl (meth)acrylamide, N-pentylamino ethyl (meth)acrylamide, N-methylamino ethyl (meth)acrylamide, N-methylamino propyl (meth)acrylamide, N-ethylamino ethyl (meth)acrylamide, N-ethylamino propyl (meth)acrylamide, N-propylamino ethyl (meth)acrylamide, N-propylamino propyl (meth)acrylamide, N-butylamino ethyl (meth)acrylamide, N-butylamino propyl (meth)acrylamide, N-pentylamino ethyl (meth)acrylamide, N-pentylamino propyl (meth)acrylamide, N-methylamino ethyl (meth)acrylamide, N-methylamino butyl (meth)acrylamide, N-ethylamino ethyl (meth)acrylamide, N-ethylamino butyl (meth)acrylamide, N-propylamino ethyl (meth)acrylamide, N-propylamino butyl (meth)acrylamide, N-butylamino ethyl (meth)acrylamide, N-butylamino butyl acrylamide, N-pentylamino ethyl (meth)acrylamide, and N-pentylamino butyl (meth)acrylamide, N,N-di-methylamino methyl (meth)acrylamide, N,N-di-methylamino ethyl (meth)acrylamide, N,N-di-ethylamino methyl acryl amide, N,N-di-ethylamino ethyl (meth)acrylamide, N,N-di-propylamino methyl (meth)acrylamide, N,N-di-propylamino ethyl (meth)acrylamide, N,N-di-butylamino methyl (meth)acrylamide, N,N-di-butylamino ethyl (meth)acrylamide, N,N-di-pentylamino methyl (meth)acrylamide, N,N-di-pentylamino ethyl (meth)acrylamide, N,N-di-methylamino ethyl (meth)acrylamide, N,N-di-methylamino propyl (meth)acrylamide, N,N-di-ethylamino ethyl (meth)acrylamide, N,N-di-ethylamino propyl (meth)acrylamide, N,N-di-propylamino ethyl (meth)acrylamide, N,N-di-propylamino propyl acrylamide, N,N-di-butylamino ethyl (meth)acrylamide, N,N-di-butylamino propyl (meth)acrylamide, N,N-di-pentylamino ethyl (meth)acrylamide, N,N-di-pentylamino propyl (meth)acrylamide, N,N-di-methylamino ethyl (meth)acrylamide, N,N-di-methylamino butyl (meth)acrylamide, N,N-di-ethylamino ethyl (meth)acrylamide, N,N-di-ethylamino butyl (meth)acrylamide, N,N-di-propylamino ethyl (meth)acrylamide, N,N-di-propylamino butyl (meth)acrylamide, N,N-di-butylamino ethyl (meth)acrylamide, N,N-di-butylamino butyl (meth)acrylamide, N,N-di-pentylamino ethyl (meth)acrylamide, and N,N-di-pentylamino butyl (meth)acrylamide, and mixtures thereof.

9. A polymer composition of claim 4, wherein said at least one aminoalkyl (meth)acrylate component in said free-radically polymerizable monomer composition is represented by formula V:

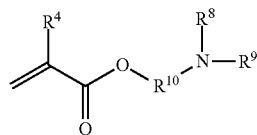

wherein $R^4$, $R^8$, and $R^9$ are as defined above, and $R^{10}$ is a linear, branched, or cyclo alkylene moiety containing 2 to 12 carbon atoms.

10. A polymer composition of claim 9, wherein said at least one aminoalkyl (meth)acrylate component is selected from N-methylaminoethyl (meth)acrylate, N-ethylaminoethyl (meth)acrylate, N-propylaminoethyl (meth)acrylate, N-butylaminoethyl methacrylate, N-(t-butyl)aminoethyl (meth)acrylate, N,N-dimethylaminomethyl (meth)acrylate, N,N-dimethylaminoethyl (meth)acrylate, N,N-diethylaminomethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoneopentyl (meth)acrylate and N,N-dimethylaminocyclohexyl (meth)acrylate, and mixtures thereof.

11. A polymer composition of claim 4, wherein said at least one vinyl ester compound in said free-radically polymerizable monomer composition is represented by formula VI:

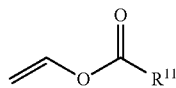

wherein $R^{11}$ is a $C_1$ to $C_{22}$ linear or branched alkyl group.

12. A polymer composition of claim 11, wherein said at least one vinyl ester compound is selected from vinyl acetate, vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neodecanoate, vinyl decanoate, vinyl versatate, vinyl laurate, vinyl palmitate, vinyl stearate, vinyl behenate, and mixtures thereof.

13. A polymer composition of claim 4, wherein said free-radically polymerizable monomer composition further comprises a polyunsaturated monomer selected from allyl pentaerythritol, allyl sucrose and trimethylolpropane diallyl ether, methylenebisacrylamide, and mixtures thereof.

14. A polymer composition of claim 4, wherein said free-radically polymerizable monomer composition comprises acrylic acid.

15. A polymer composition of claim 14 wherein said free-radically polymerizable monomer composition further comprises at least one alkyl ester of (meth)acrylic, acid, wherein the alkyl moiety contains 1 to 30 carbon atoms.

16. A polymer composition of claim 14 wherein said free-radically polymerizable monomer composition further comprises at least one polyunsaturated crosslinking monomer.

17. A polymer composition of claim 16 wherein said at least one polyunsaturated crosslinking monomer selected from allyl pentaerythritol, allyl sucrose, trimethylolpropane diallyl ether, methylenebisacrylamide, and mixtures thereof.

18. A polymer composition of claim 1, wherein said non-aqueous liquid medium comprises a solvent selected from at least one hydrocarbon solvent, at least one organic solvent, and mixtures thereof.

19. A polymer composition of claim 18, wherein said hydrocarbon solvent is selected from aromatic and substituted aromatic hydrocarbons, substituted or unsubstituted, straight or branched chain saturated aliphatic hydrocarbons of 5 or more carbon atoms, a saturated alicyclic or substituted alicyclic hydrocarbon having 5 to 8 carbon atoms, chlorinated hydrocarbons, and mixtures thereof.

20. A polymer composition of claim 18, wherein said organic solvent is selected from $C_1$-$C_6$ alkyl acetates, $C_1$-$C_6$ alkyl propionates, ketones containing 3 to 6 carbon atoms, and saturated alcohols containing 1 to 12 carbon atoms.

21. A polymer composition of claim 19, wherein said hydrocarbon solvent is selected from pentanes, hexanes, heptanes, octanes, cyclohexane, cycloheptane, cyclooctane, toluene, xylene, and methylene chloride.

22. A polymer composition of claim 20, wherein said organic solvent is selected from methyl acetate, ethyl acetate, propyl acetate, isopropyl acetate, butyl acetate, methyl ethyl ketone, and cyclohexanone.

23. A polymer composition of claim 18, wherein said non-aqueous liquid medium comprises a solvent selected from a mixture of a hydrocarbon solvent selected from a saturated alicyclic or substituted alicyclic hydrocarbon having 5 to 8 carbon atoms and an organic solvent selected from $C_1$-$C_6$ alkyl acetates.

24. A polymer composition of claim 23, wherein said non-aqueous liquid medium comprises cyclohexane and ethyl acetate.

25. A polymer composition of claim 23, wherein said non-aqueous liquid medium comprises said hydrocarbon solvent to said organic solvent in a range from about 80:20 to about 20:80 (wt./wt.).

26. A polymer composition of claim 25, wherein said non-aqueous liquid medium comprises said hydrocarbon solvent to said organic solvent in a range from about 70:30 to about 30:70 (wt./wt.).

27. A polymer composition of claim 26, wherein said non-aqueous liquid medium comprises said hydrocarbon solvent to said organic solvent in a range from about 67:33 to about 33:67 (wt./wt.).

28. A polymer composition of claim 1, wherein the amount of said N-vinyl pyrrolidone in said stabilizer monomer composition ranges from about 38 to about 72 mol. % and said at least one short chain alkyl ester of (meth)acrylic acid and at least one long chain alkyl ester of (meth)acrylic acid ranges from about 62 to about 28 mol. %.

29. A polymer composition of claim 28, wherein the amount of said N-vinyl pyrrolidone in said stabilizer monomer composition ranges from about 55 to about 70 mol. % and said at least one short chain alkyl ester of (meth)acrylic acid and at least one long chain alkyl ester of (meth)acrylic acid ranges from about 45 to about 30 mol. %.

30. A polymer composition of claim 1, wherein the amount of said at least one long chain alkyl ester of (meth)acrylic acid is present in the stabilizer monomer composition in a molar ratio of said at least one long chain alkyl ester of (meth)acrylic acid to said N-vinyl pyrrolidone of ≥0.11.

31. A polymer composition of claim 30, wherein the amount of said at least one long chain alkyl ester of (meth)acrylic acid is present in the stabilizer monomer composition in a molar ratio of said at least one long chain alkyl ester of (meth)acrylic acid to said N-vinyl pyrrolidone ranges from 0.2 to about 2.

32. A polymer composition of claim 31, wherein the amount of said at least one long chain alkyl ester of (meth)acrylic acid is present in the stabilizer monomer composition in a molar ratio of said at least one long chain alkyl ester of (meth)acrylic acid to said N-vinyl pyrrolidone ranges from about 0.3 to about 1.6.

33. A polymer composition of claim 32, wherein the amount of said at least one long chain alkyl ester of (meth)acrylic acid is present in the stabilizer monomer composition in a molar ratio of said at least one long chain alkyl ester of (meth)acrylic acid to said N-vinyl pyrrolidone ranges from about 0.4 to about 0.75.

34. A polymer composition of claim 15, wherein said free-radically polymerizable monomer composition comprises a monomer selected from lauryl methacrylate, stearyl methacrylate, and mixtures thereof.

35. A polymer composition of claim 34, wherein said free-radically polymerizable monomer composition further comprises at least one polyunsaturated crosslinking monomer.

36. A polymer composition of claim 35, wherein said at least one polyunsaturated crosslinking monomer is selected from allyl pentaerythritol, allyl sucrose, trimethylolpropane diallyl ether, methylenebisacrylamide, and mixtures thereof.

* * * * *